United States Patent

[11] 3,555,239

| [72] | Inventor | William J. Kerth |
| | | 600 Garden St., Sacramento, Calif. 95815 |
| [21] | Appl. No. | 594,726 |
| [22] | Filed | Nov. 16, 1966 |
| [45] | Patented | Jan. 12, 1971 |

[54] WELDING MACHINE WITH DIGITAL PULSE CONTROL
15 Claims, 50 Drawing Figs.

[52] U.S. Cl...................................................... 219/125,
90/13.99; 219/131; 235/151.1; 318/162
[51] Int. Cl....................................................... B23k 9/12
[50] Field of Search........................................... 219/124,
125, 126, 124PL, 125Pl, 131, 78; 90/13.99;
318/20.10, 20.300, 20.310, 20.315, 30.105,
30.320; 235/151.1, 151.11

[56] References Cited
UNITED STATES PATENTS

| 2,900,486 | 8/1959 | Williams et al. | 219/125 |
| 3,009,049 | 1/1961 | Stanley | 219/124X |
| 3,076,889 | 2/1963 | Enk | 219/125 |
| 3,202,895 | 8/1965 | Arp et al. | 318/162 |
| 3,414,787 | 12/1968 | Reuteler et al. | 318/162X |
| 2,766,361 | 10/1956 | Landis et al. | 219/131 |
| 3,110,865 | 11/1963 | Scuitto | 318/2.110UCUX |
| 3,126,471 | 3/1964 | Nelson | 219/125 |
| 3,128,367 | 4/1964 | Darmon et al. | 219/78 |
| 3,183,421 | 5/1965 | Herchenroeder | 318/20.310UX |
| 3,267,251 | 8/1966 | Anderson | 219/125PL |

OTHER REFERENCES
Ware, W. E. Direct Digital Control, June, 1965, pp 79— 81 from Instruments and Control Systems June, 1965

*Primary Examiner*—J. V. Truhe
*Assistant Examiner*—L. A. Schutzman
*Attorney*—Owen, Wickersham & Erickson

ABSTRACT: An integrated programmed automatic welding machine is presented.

First, second, third, fourth and fifth independent pulse-actuated position control means respectively move the welding torch 1 up and down vertically, 2 right and left horizontally, and 3 horizontally forward and back and for tilting the torch 4 right and left and 5 forward and backward. There may be pulse-actuated wire feed control means for varying the rate of feed of welding wire to the torch, and pulse-actuated electrical control means for varying the weld energy factors at the torch. Programming means direct the time cycle of all of the control means, and digital pulse delivery means are connected to and controlled by the programming means and are connected to and control each control means, by sending thereto an appropriate quantity of pulses at an appropriate rate.

PATENTED JAN 12 1971    3,555,239

INVENTOR
WILLIAM J. KERTH
BY
Owen, Wickersham & Erickson
ATTORNEYS

INVENTOR
WILLIAM J. KERTH
BY
Owen, Wickersham & Erickson
ATTORNEYS

INVENTOR
WILLIAM J. KERTH
BY
Owen, Wickersham & Erickson
ATTORNEYS

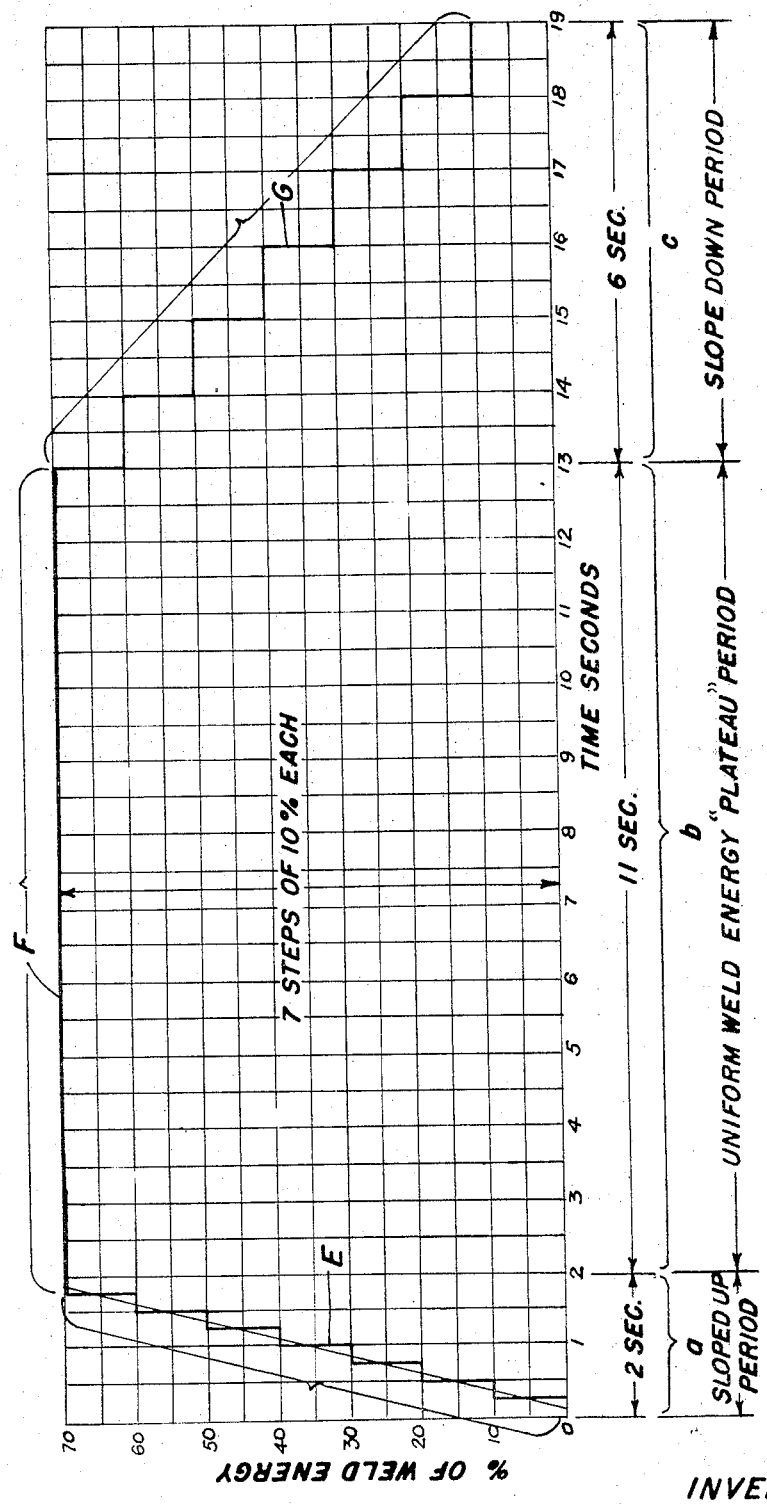

WELD TORCH PATTERN

INVENTOR
WILLIAM J. KERTH
BY
Owen, Wickersham & Erickson
ATTORNEYS

PATENTED JAN 12 1971　　　　　　　　　3,555,239

INVENTOR
WILLIAM J. KERTH
BY
Owen, Wickersham & Erickson
ATTORNEYS

INVENTOR
WILLIAM J. KERTH

ATTORNEYS

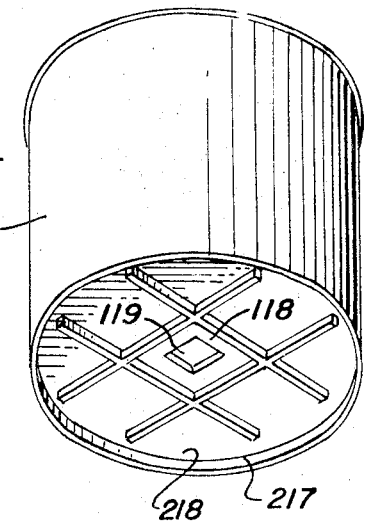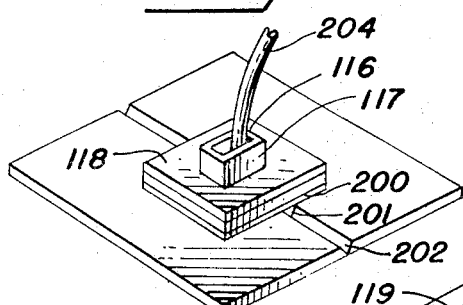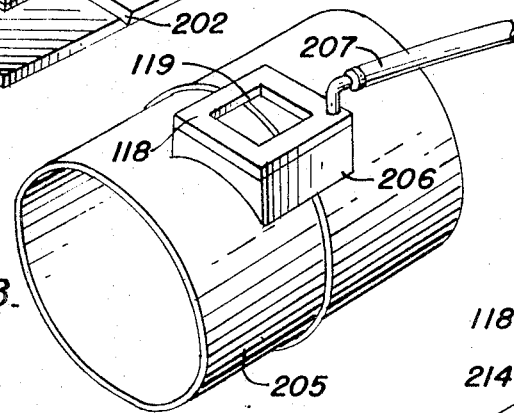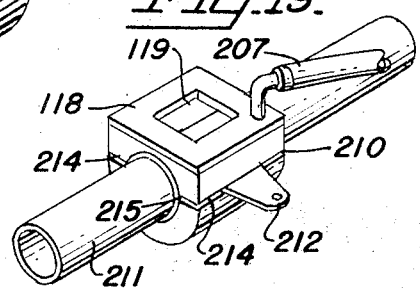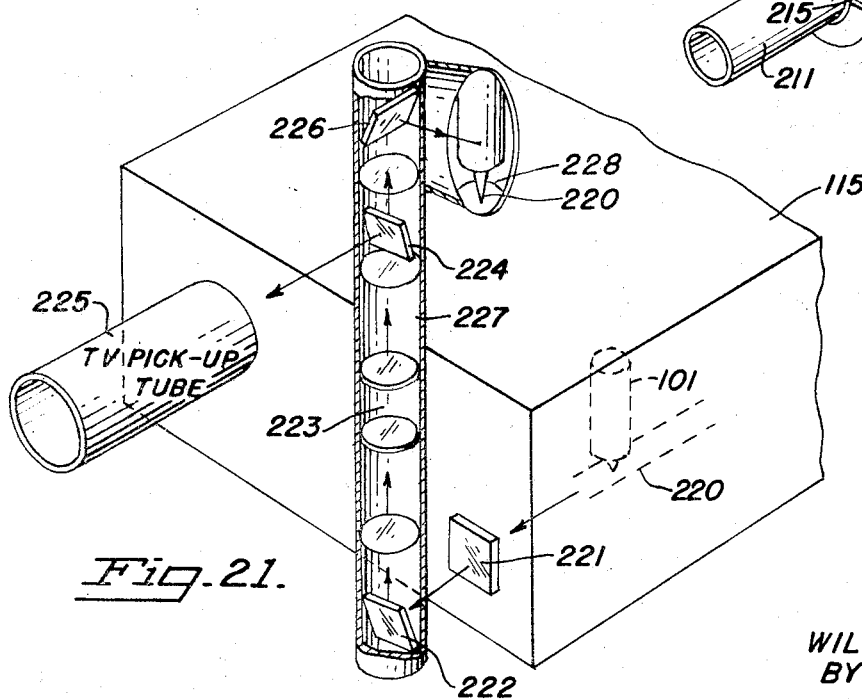

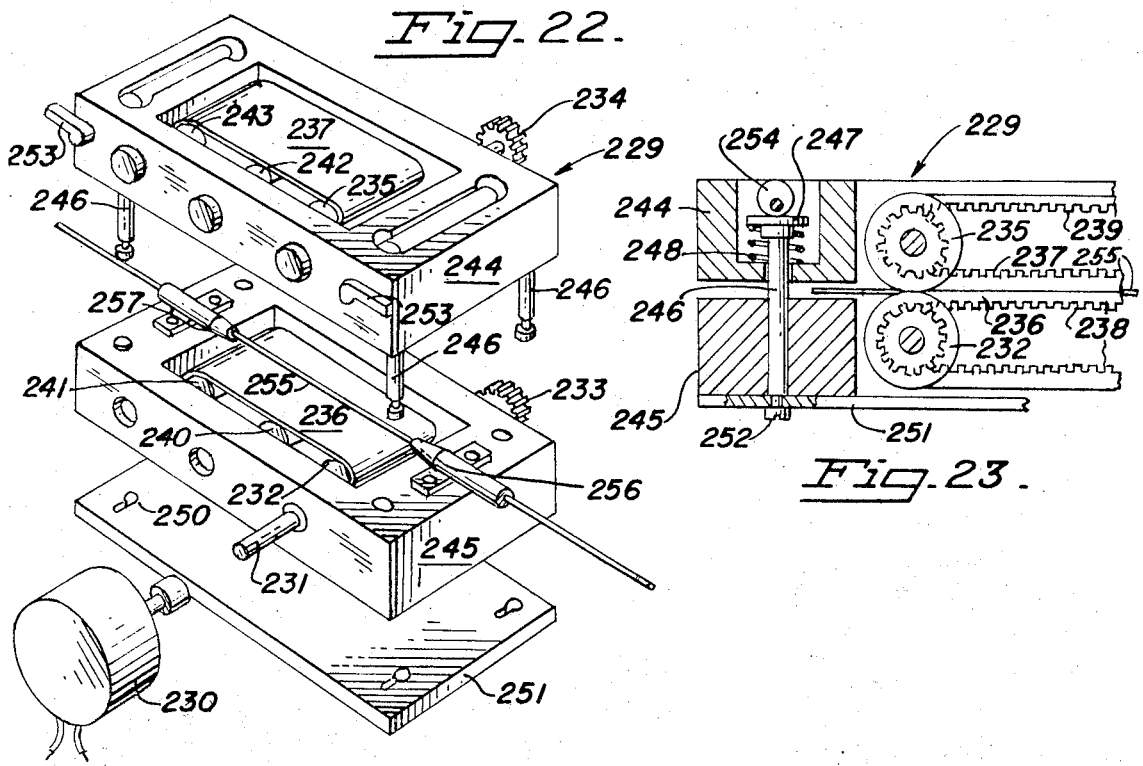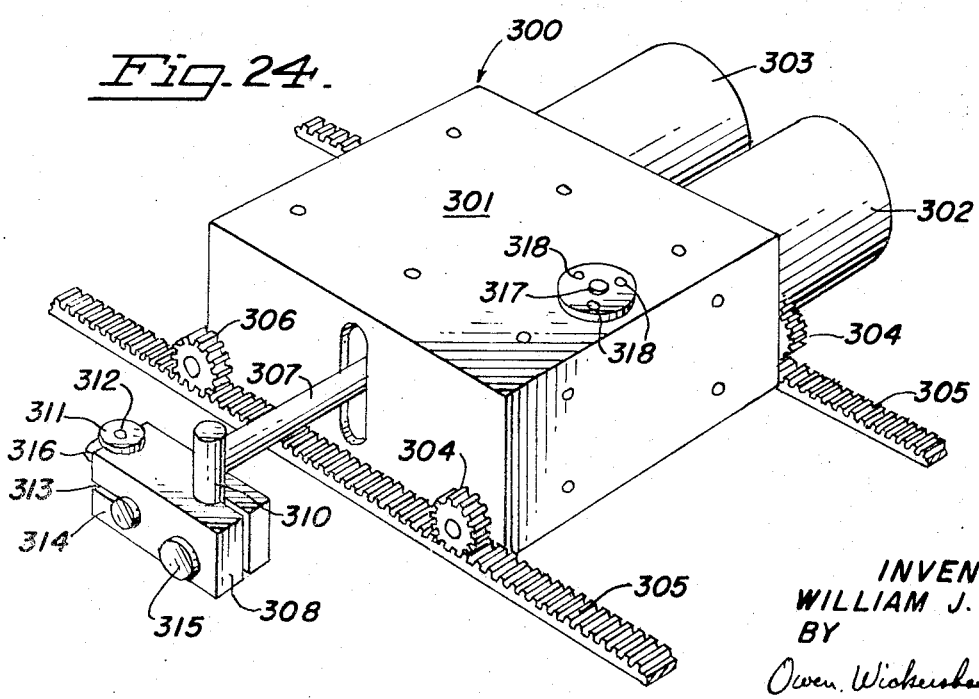

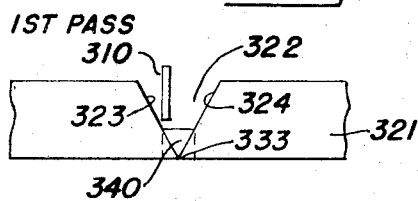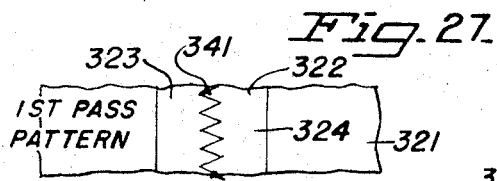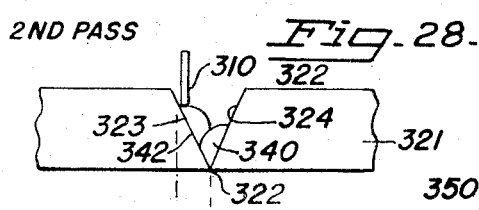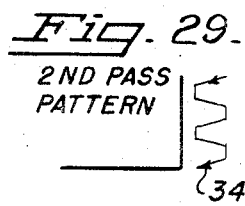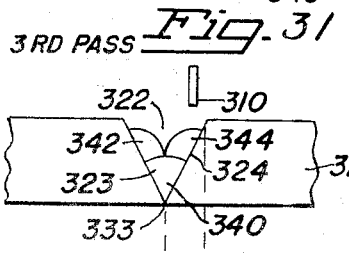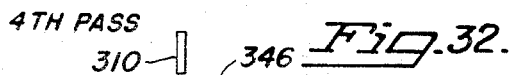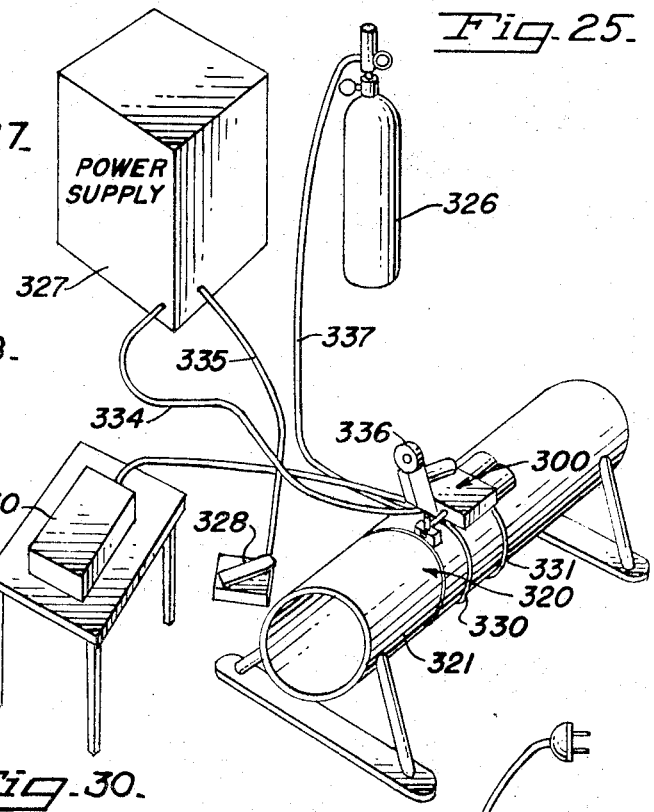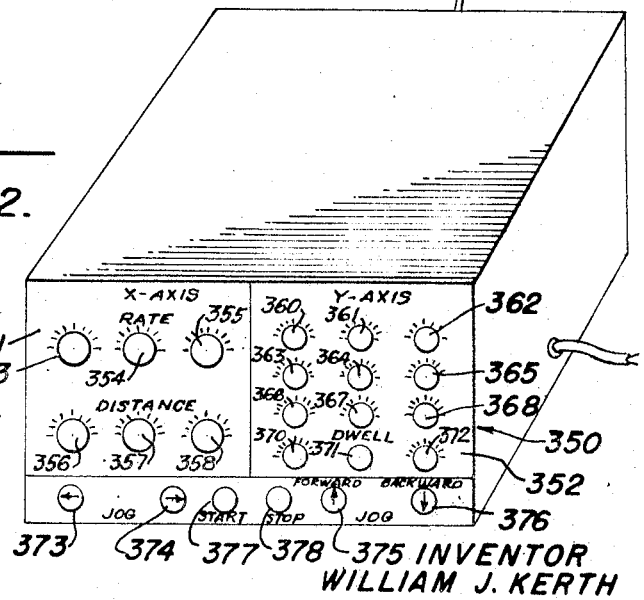

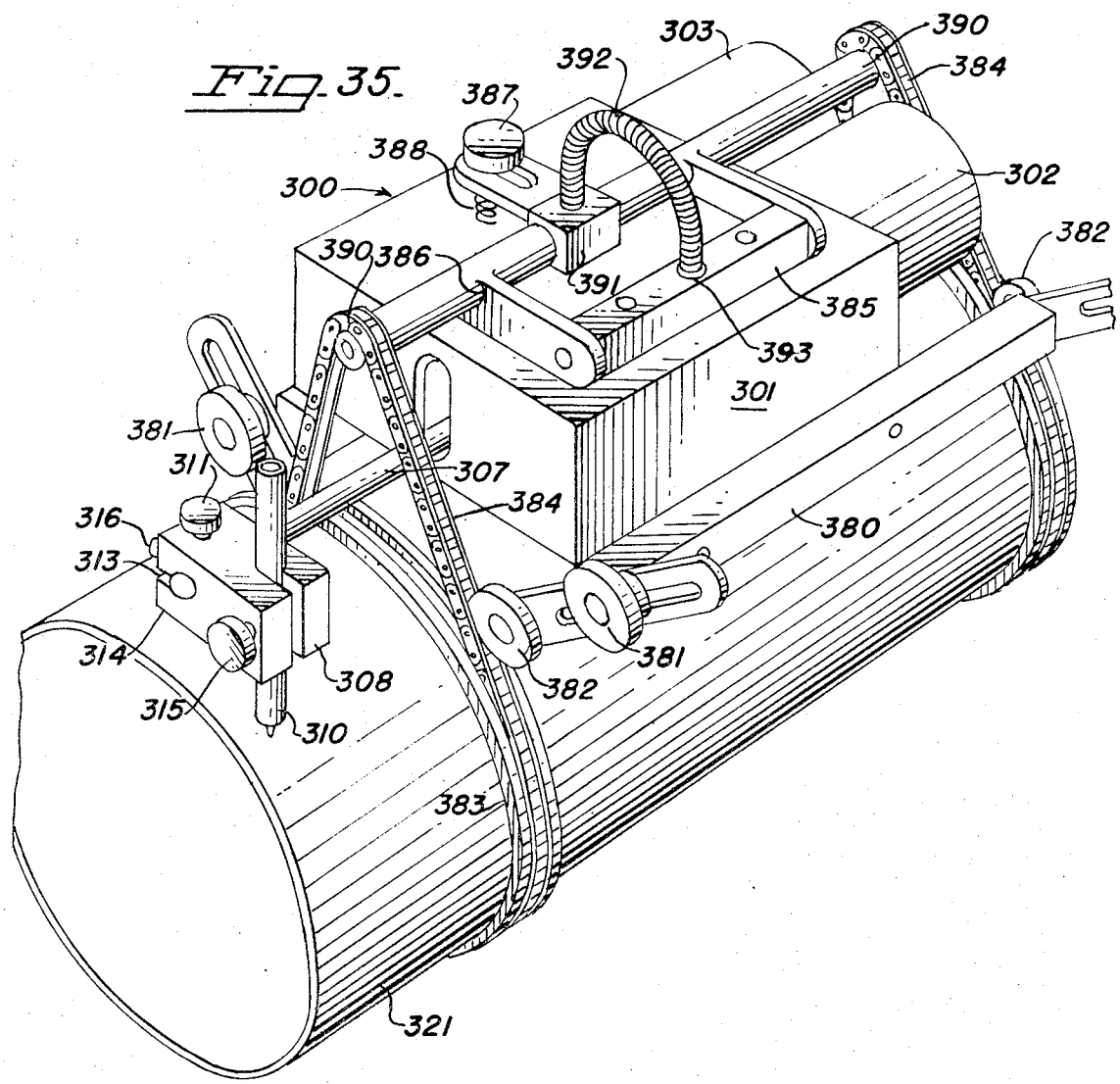

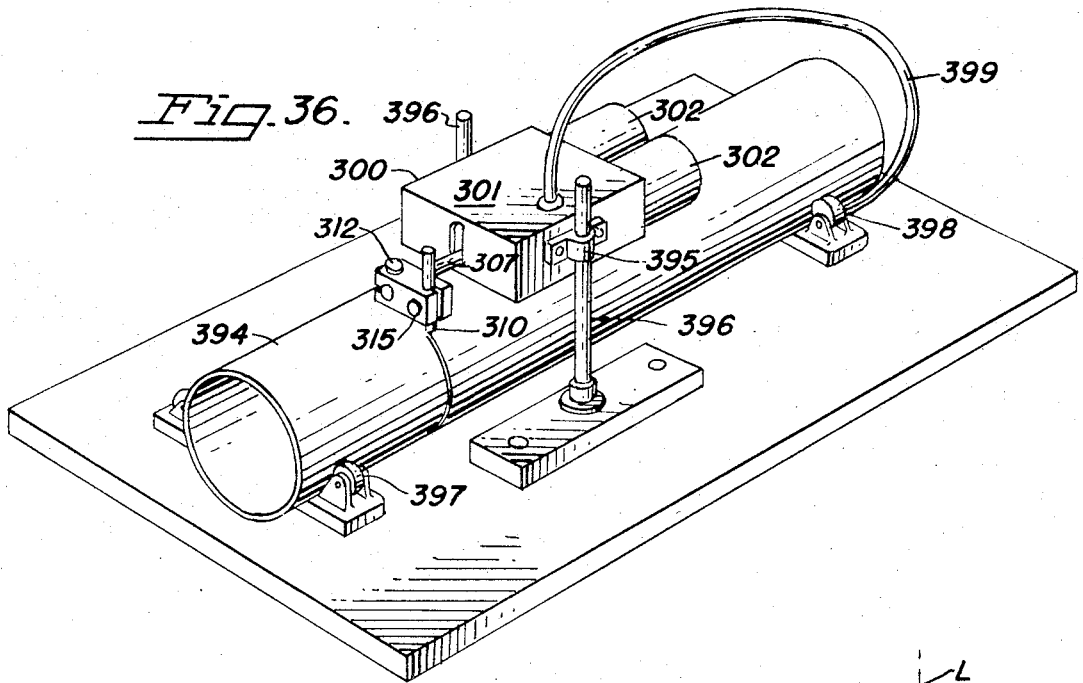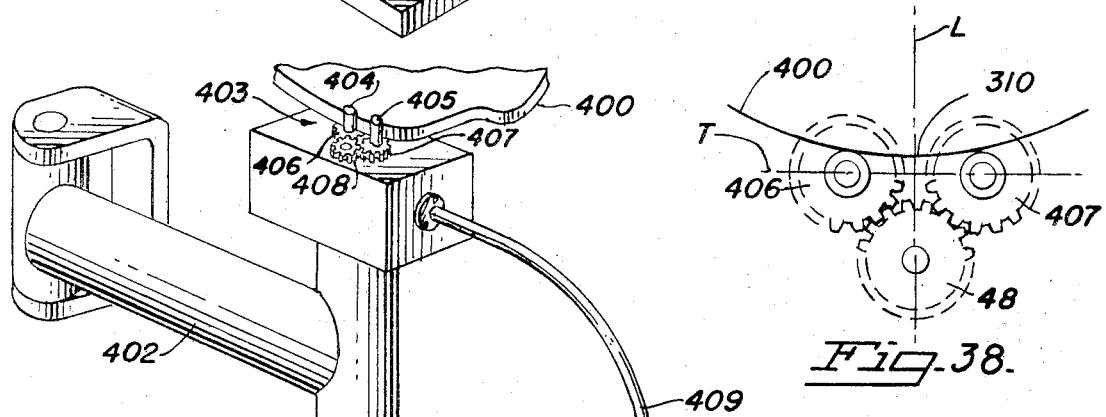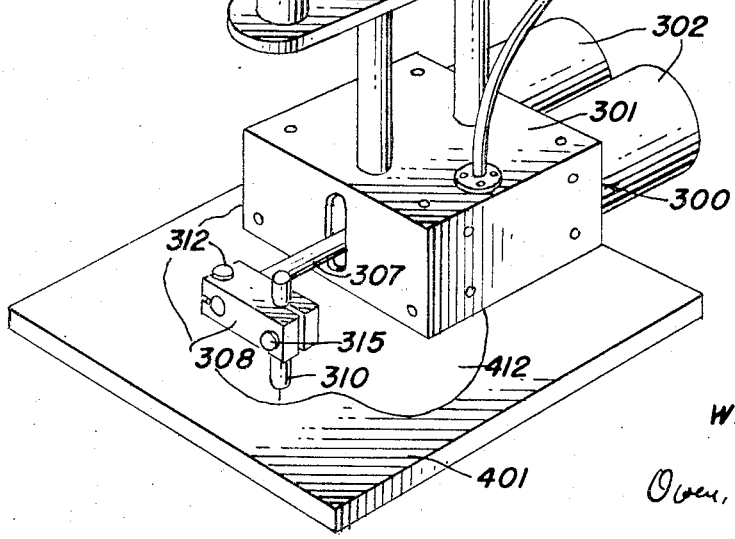

INVENTOR
WILLIAM J. KERTH

Owen, Wickersham & Erickson
ATTORNEYS

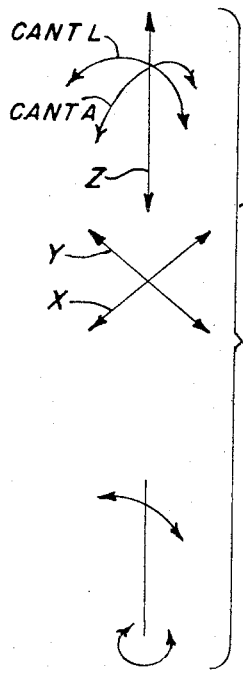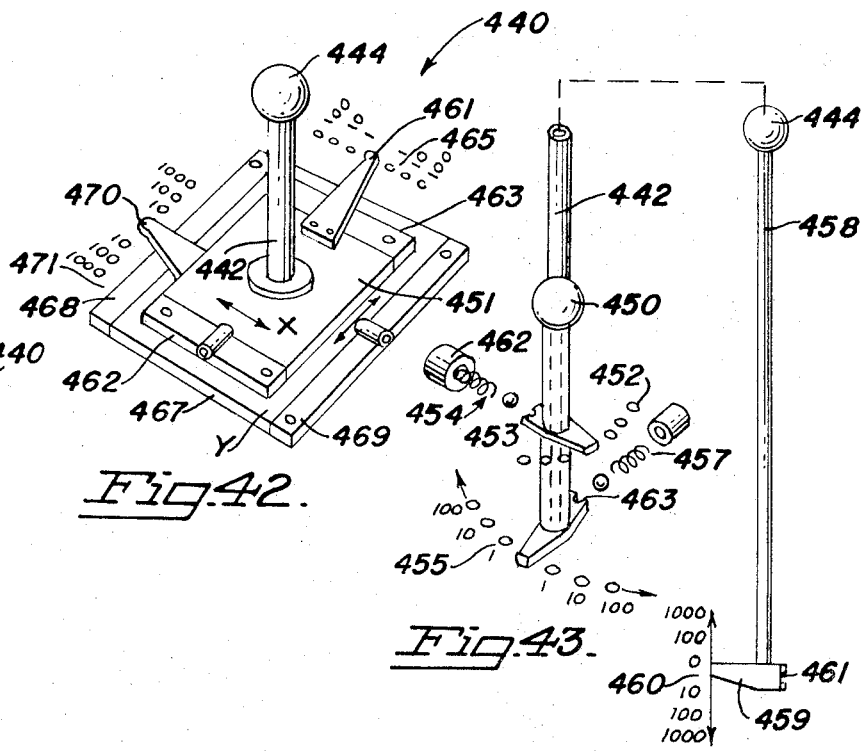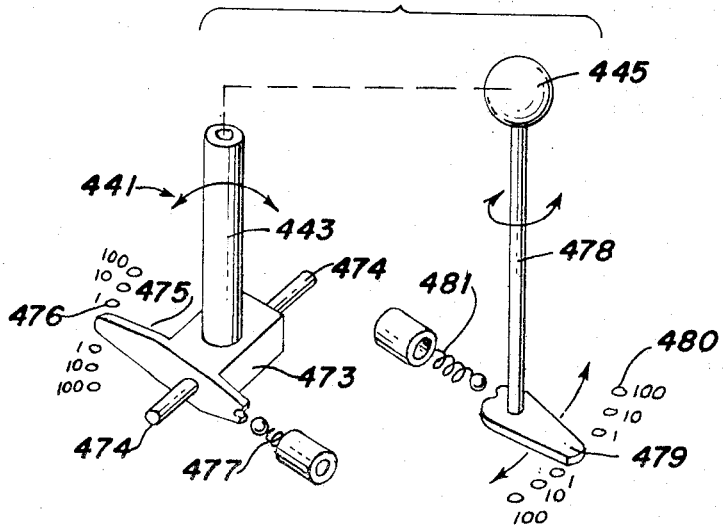

TEMPERATURE

INVENTOR
WILLIAM J. KERTH

*Owen, Wickersham & Erickson*

ATTORNEYS

WELDING MACHINE WITH DIGITAL PULSE CONTROL

This invention relates to improvements in electric welding. More particularly, the invention relates to improvements providing increased automation in welding, with increased mobility of a welding head capable of automatic control, and also control over many other factors of welding, thereby enabling duplication of the best hand welding and also enabling surpassing of the best manually controlled welding. It also relates to a welding system employing digital pulses to control the operation and enabling and utilizing digital computers to control every phase of the welding. It provides an improved system and improvements in many parts of the system, including means for imparting five different motions and combinations thereof to the welding head and for controlling those motions by digital control means acting through counted pulses.

Today's traditional image of the arc welding process centers on a man in a heavy helmet and gauntlets, with his blue arc-tipped welding torch spurting sparks as he moves a stick electrode along an open seam between two pieces of metal. For years, this method has been the accepted one used in fusing metal surfaces on ships, tanks, pipe lines, bridges, and for maintenance and repair work. However, the demands of new technologies and the pressing needs for flawless welds in the fabrication of nuclear submarines and power plants plus a host of new requirements in the aerospace industry call for standards of performance extremely difficult—if not impossible—for the familiar "man in the mask" to carry out.

The invention is not a new type of welding but it applies to all the types of welding, including stick-electrode TIG (tungsten inert gas), MIG (metal inert gas), ultrasonic, electron beam, laser beam, plasma arc, submerged arc, flash, and acetylene gas welding. Instead, the invention relates to an improved application of all these types, being analogous to an improvement on human hands, fixed welding torches with the work moving under them, oscillating welding torches capable of moving along a weld line, and so on. The present invention provides unique methods of applying various welding techniques to various specific assignments in various environments, with a uniformity of performance heretofore unattainable and the ability to reproduce completed welds precisely and repeatedly. It is also concerned with apparatus for accomplishing the methods.

The methods of applying these welding techniques involve a number of factors, all of which affect the quality of a weld. For example, any weld technique requires relative movement between the weld torch and the workpiece. In the present invention, torch motion may be accomplished along five axes of movement and combinations of these axes, namely, (1) horizontal from side to side (X axis), (2) horizontal forward and back (Y axis), (3) vertical (up and down or Z axis), (4) canting or tilting forward and back (rotary movement about X axis) and (5) canting or tilting left and right (rotary movement about Y axis). These basic axes of movement correspond to the movements of a man's hand holding a torch. If any of these motions is not accurately reproduced in relation to one another, the uniformity and quality of the weld are adversely affected, resulting in nonstandardized welds. The present invention enables accurate reproduction and control of all five of these movements and all combinations thereof.

In addition to motion control, the weld energy which produces the molten puddle must be controlled and synchronized with the torch motions. This, the invention also does.

Further, for those welding processes requiring the introduction of filler material, the rate at which the material (wire, rod, etc.) is fed into the puddle must be controlled and synchronized with both the motion and weld energy patterns. This also is done by this invention.

The present invention enables machine-controlled interrelation and synchronization, in a repeatable manner, of torch motion, variations in weld energy application, and rates of wire feed, thereby imparting the ability to produce standardized and reproducible welds. This ability, once mastered and automated, also makes it possible to produce standardized welds of a quality hitherto impossible and unattainable by manual control alone. Such a capability obviates faulty welds and the inspection, grinding, and rewelding operations so often required heretofore for correction. It reduces the amount of labor involved in both welding and inspection. It eliminates the need for the construction of costly rigs to rotate or move the object being welded, which heretofore have been used beneath the torch so as to maintain the welding process on a horizontal plane. Moreover, it makes possible welding in environments normally hostile to men, as in a vacuum, underwater, in radiation areas, or in outer space.

Because the many variable factors were heretofore incapable of accurate interrelation, either by a man or a machine, faulty welds have continued to be a major problem. Hence, when this invention controls and/or alters these variables in a programmed manner, weld puddle uniformity and penetration characteristics can be maintained and repeated regardless of the plane of the welding operation—whether that plane be horizontal, vertical, upside down, or moving and changing, (as in the case of welding around a pipe). With this invention, an entirely new field of welding procedure becomes possible.

A few examples of what this means to current welding assignments will be illustrative of the significance of the invention:

1. Welding Large, Horizontal Cylindrical Vessels. Today, such vessels (for example, huge rocket motor housings), have to be rotated on specially designed roller tables so that the weld operation can be carried out in one place and in one plane. The attempt has been to impart uniform puddle characteristics along the entire line of the rotated weldment line, and the attempt has not always been successful. However, with the present invention, uniform puddle characteristics can be accomplished, by using a programmed welding torch assembly traveling along the line of the weld, circling the stationary vessel.

2. Welding Very Large Vessels Incapable of Being Rotated. A typical example is welding the curving hull of a nuclear submarine. Most such tasks have heretofore been carried out manually, with several men working simultaneously at spaced intervals around the hull; their nonuniform hand motion, different welding speeds, arc distances, and deposit rates have resulted in welds of irregular character. On the other hand, the automated and programmed welding systems of the present invention, employing several equally spaced weld head units along the line of weldment, accomplish the same job with precise, unvarying weld patterns. The welding action may be done in a single 360° pass around the vessel with each weld head carrying out an individual program simultaneously with the other weld heads—i.e., one head doing root passes, another doing shoulder welds, a third doing wash welds, etc. Each pass is controlled to provide automatic welding head action with compensation for the changing gravitational effects on the molten puddle of each weld at the positions of the respective weld heads.

3. This same general system is applicable to pipe line welding, where the weld head units of this invention may be "ganged" and, operating from a common controller, carry out the welding of many pipe sections simultaneously.

4. Production Welding of Irregularly Shaped Parts That Vary in Thickness. A typical instance would be the welding of an airplane wing, or, more significantly, a series of airplane wings which should be identical. This assignment usually alters a number of the variables requiring precision control. For example, the center line axis of the weld may be continually changing (motion control), the varying thickness of the part may necessitate a change in the up and down position of the torch (motion control), while the same variations in part thickness may require varying amounts of weld energy (weld energy control). Heretofore, the only way of carrying out production welding of a large number of irregularly shaped, but identical, parts has been to use large numbers of skilled men; these men were capable of adjusting to these variables but, unfortunately, with varying degrees of skill and in a random, nonuniform manner. The present invention accomplishes such tasks with uniform, high quality welds to all parts. One automated program of the present invention, carefully designed for the parts described, can impart to 50 (or more or fewer) automated weld head units digital instructions that will carry out the assignment with much greater precision than could ever be accomplished by 50 men. Moreover, a control tape can be made and reproduced that enables exact reproduction of (for example) airplane wings in several widely separated factories, with identical results. This reproducability of complex programs is a feature of the invention.

The automation and accuracy achieved by the present invention have been sought before, but not with complete success. For example, some conventional welding systems have tried to achieve motion control by employing direct current motors with closed feedback loops and amplifying circuits. To vary the speed of the DC motor, the motor speed has been made to vary in proportion to the change in resistance of a circuit component. However, this prior art system had the inherent disadvantage that when there were transient changes of resistance, the inertia of the motor and the response time of the feedback loop prevented accurate reproduction of known conditions during the transient period. It has also been extremely difficult to obtain accurate reversal of the direction of rotation of the DC motor at known reproducible rates.

So-called "numerical control" metal removing machines (lathes, milling machines, grinders) have been highly developed to deal with fixed known distances on several axes, but these machines operate very differently from the processes required to produce standard welding conditions. The requirements for automating a welding process are much more difficult to standardize, because the parameters involved are not exact finite distances and because the rates of motion may vary logarithmically, sinusoidally, or otherwise nonlinearly, and must have the ability to be continually varied, each with respect to the other, during a given excursion.

Of the two basic approaches to automating processes, the analogue and the digital, the present invention is characterized by being digital. While these two methods are easy to define and explain mathematically, simplified explanations are not so easy. It may be said that in the analogue approach a condition is indicated by a comparable analog level, such as feedback voltage from a DC motor. A significant disadvantage of the analogue method is its inherent inability to deal with the many variables and unknowns within the system to be controlled. Line losses and variations in the physical properties of components directly affect its ability to produce accurate known conditions. The variables are difficult to predict and to compensate for, and the end results are only as good as the worst of the predictions.

In the digital approach, used by the present invention, the results are indicated by a combination of digits, bits or pulses. An advantage of this method is its extreme accuracy, repeatability and control of all the variables. This is possible because a discrete combination of bits represents each condition, and the line losses and component variations do not affect the accuracy of the end results.

Among the objects of the invention are the following: to provide a weld head capable of five types of motion, three rectilinear along three mutually perpendicular axes and two rotary about two mutually perpendicular axes; to control these five types of motion so as to combine them into all possible types of weld head movement, comparable to a humanly held weld torch; to exercise this control through pulse-actuated motors which are themselves controlled by a digital control system; to enable recording of successful weld patterns for exact duplication by means of a digital computer or other recording and playback devices; to enable accurate and continuously variable control of weld energy and wire feed to the weld, also by digitally controlled pulses, with reproducing means for digital computer operation or operation by other recorded playback equipment; to enable extremely subtle variations and their control during elaborate programs; to enable automatic correction of conditions, automatic calculation of needed changes for different situations, and to also enable manual overriding thereof; to enable welding in very difficult situations; to provide less expensive, simplified equipment for use where less subtlety is needed or where fewer degrees of movement are required; to reduce the cost of welding while raising weld quality in numerous situations; and to establish a welding system that makes possible the fixing of weld standards and their faithful reproduction.

Other objects and advantages of the invention will appear from the following description of some preferred forms thereof.

In the drawings:

FIG. 6 is a time-energy diagram of a simple weld program using the digital slope generator of FIG. 4, in the configuration shown in FIG. 7.

FIG. 17 is a fragmentary view in perspective of a portion weld head assembly of FIGS. 12—15, showing connection of its welding well and base plate only to a shielding plate, and showing the position of these parts as they are placed to weld a straight seam.

FIG. 18 is a view similar to FIG. 17 of a modified form of shield being used in connection with a cylindrical pipe seam weld. Only the base plate of the weld head assembly itself is shown here, the other parts being omitted for the sake of clarity.

FIG. 19 is a view similar to FIG. 18 of a modified form of shielding device.

FIG. 20 is another view similar to FIG. 18 of a further modified form of shielding device.

FIG. 21 is a fragmentary view in perspective partly in phantom of a portion of a welding assembly incorporating a combination direct and remote observation system for watching the weld action.

FIG. 22 is an exploded view in perspective of a wire feeding device employed to feed welding wire to the weld point, and digitally controlled through a pulse motor according to the principles of this invention.

FIG. 23 is an enlarged fragmentary view in elevation and partly in section of a portion of the assembled wire feeding device of FIG. 22.

FIG. 24 is a view in perspective of a simplified form of welding device embodying the principles of the invention and useful for semiautomatic welding.

FIG. 25 is a view in perspective of an installation employing the device of FIG. 24 for welding pipe.

FIG. 26 is an enlarged view in elevation and in section showing the first pass made by the assembly of FIG. 25.

FIG. 27 is a top plan view of the first pass pattern.

FIG. 28 is a view like FIG. 26 showing the second pass of the FIG. 25 assembly.

FIG. 29 is a top plan view like FIG. 27 of the second pass pattern.

FIG. 30 is a view like FIG. 28 showing the third pass thereof.

FIG. 31 is a top plan view like FIG. 27 showing the third pass pattern.

FIG. 32 is a view like FIG. 29 showing the fourth pass by the FIG. 25 assembly.

FIG. 33 is a top plan view like FIG. 27 showing the fourth pass pattern.

FIG. 34 is a view in perspective of a control panel for the simplified weld head of FIGS. 24 and 25.

FIG. 35 is an enlarged view in perspective of the FIG. 25 installation of the simplified weld device of FIG. 26, involving fixed pipe welding by a rotating head.

FIG. 36 is a view in perspective of a welder used with a rotating pipe and employing the simplified weld head of FIG. 24.

FIG. 37 is a view in perspective of a free form, template welder employing the simplified weld head of FIG. 24.

FIG. 38 is a plan view of a portion of FIG. 36, showing the template and alignments.

FIG. 42 is a view in perspective of a jog control device for use in the present invention.

FIG. 43 is an exploded view in perspective of a portion of FIG. 42.

FIG. 44 is a diagrammatic view of the action of the jog control stick shift device of FIG. 42.

FIG. 45 is an exploded view in perspective of another form of jog control device.

THE INVENTION BROADLY CONSIDERED

Figure 1:
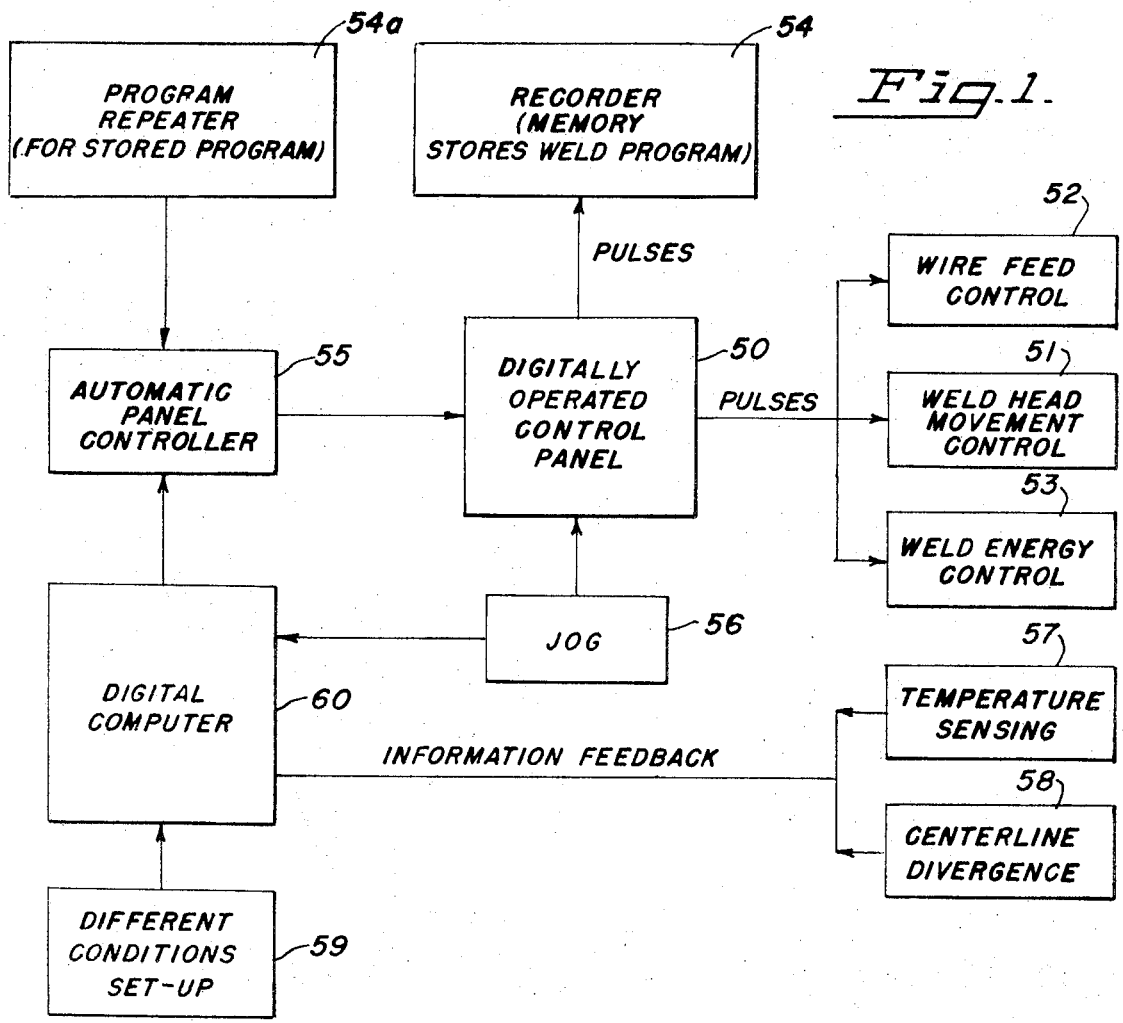
FIG. 1 is a block diagram of a welding system embodying the principles of the invention.

In general, the welding system of this invention comprises a series of digitally metered, pulse-operated controls which move a welding torch, feed the weld wire, and vary the weld energy, all in tiny increments at the rate of one increment per pulse. The pulses themselves are supplied at carefully standardized rates and are metered digitally. The number of pulses per unit time that is applied to any one pulse-actuated component determines what that component does. Thus, by digitally controlling the pulse rate and number of pulses sent to a component, operation becomes precise and repeatable. By employing small increments planar rapid pulse rates—both precisely controlled—and by superimposing various factors or movements upon the weld head, complete control is obtained.

In a simple form of the apparatus, the weld head may have only movement along a plane. All movements along a plane can be obtained by imparting two motions to the weld head, one motion along each of two mutually perpendicular axes, provided that the two motions can be superimposed on each other. By using pulse-operated motors to control these two motions, by having each pulse to each motor move that motor a standard amount, by having that standard amount be a small increment, and by having the pulses fed rapidly at a standard rate, any desired pattern of planar movement of the weld head can be obtained. By having wire feed and weld head energy similarly controlled by standardized pulses that are related in rate to those controlling weld head movement, all the principal factors of welding can be digitally controlled. Being digitally controlled, the welding machine can be made to follow a program set up on a digital programmer, can be made to repeat the same program precisely any number of times and thus be made fully automatic.

A more sophisticated system employs more motions—rectilinear movement along each of three mutual perpendicular axes plus rotary movement about each two mutually perpendicular axes. Such a system can be utilized for accurately moving with respect to each and all five of these axes any device used for cutting, fusing, or welding of a material, whether the device be a stick electrode, a flux coated wire, a laser beam, a plasma arc, an oxygen-acetylene torch, a cutting torch, an electron beam, an inert gas device, a submerged arc, and so on.

The digitally metered, pulse-operated system enables the control and interrelation of all the parameters affecting the weld, including: the five types of head movements, the amperage, voltage, and phase relation of the weld energy, the slope, buildup, plateauing, and decay of transformer characteristics, the polarity of direct current, weldment feedback temperature, displacement due to irregular fit up, and wire feed.

The weld energy components (voltage, current, phase, polarity, etc.) can be digitally varied in preselected known steps or increments by a temperature feedback device such as a thermocouple or thermistor measuring the temperature of the weldment. The feedback signal (in the form of a voltage or a change of resistance) may readily be converted to digital pulses, and these digital pulses can then be used to increase or decrease the voltage, current and other weld energy components so that as the weld head progresses during its welding process, the effects of weldment change in temperature are corrected.

One of the many well-known methods of determining the center line of the weld, whether optimal, magnetic or physical, can similarly be fed back to give a digital signal that can produce right and left oriented pulses, which, when fed to a pulse motor controlling the head motion along the X axis corrects the center line position of the weld head.

SIMPLIFIED EXPLANATION OF THE INVENTION'S CONTROL SYSTEM

A welding system of this invention may be better understood by reference to the simplified block diagram of FIG. 1, which shows a control panel 50 sending digitally controlled pulses to the various welding controls, such as a weld head movement control 51, a wire feed control 52, and a weld energy control 53, each of which may be a complex device. These elements 50, 51, 52, and 53 are all that are needed for manual operation, and in that instance the operator manually controls the panel 50.

For exact repetition of a satisfactory pattern or weld program, the time functions sent by the panel 50 to these various controls 51, 52, and 53, are recorded by a recorder 54 which supplies a memory for the system (stores the weld program) and enables exact repetition of the complete sequence of any recorded operation. The record can then be fed by a repeater 54a to an automatic panel controller 55 which, in accordance with the record, the stored program, controls the panel 50. If minor changes of the stored program are desired, a jog device 56 may be used manually to superimpose corrective patterns on the control panel 50 at any time and to correct memory, if necessary.

At the weld head, instruments such as a temperature sensor 57 and a device 58 for detecting the extent of center line divergence may be used to collect information and feed it back to a digital computer 60. When a record made by the recorder 54 is to be applied to a situation where the conditions are different than were present when the record was made, information about these different conditions may be set up on the digital computer 60 by a device 59. The digital computer 60 then acts on the control panel 50 through its automatic controller 55.

The system can thus be operated in any of three modes:

1. Manual. The relative factors of weld head movement 51, wire feed 52, and weld energy 53 may be controlled by manually varied pulse generators and manually set, pulse counting circuits. Triggering pulses to interrelate the various factors may also be set manually. This gives manual control without having to handle the torch itself, or the wire feeder itself, or the various machinery for controlling weld energy.

2. Repetitive. The pulses may be produced, generated, and counted and interrelated automatically from stored information, so that the factors 51, 52, and 53 are automatically controlled.

3. Computed. The pulse system may be under control of a digital computer which may be set up independently from stored information or partially dependent upon it.

4. Feedback corrected. Either of modes 2 and 3 may have superimposed thereon automatic corrections fed back from information gatherers 57 and 58 working at the weld head, relating to material thickness, hardness, radiation energy, infrared scanning of puddle size, etc.

5. Manually modified. Any one of the above modes may be used in combination with manual interjection of correction pulses generated by a welding observer on the jog device 56.

A SPECIFIC CONTROL PANEL 50 OF THE INVENTION (FIGS. 2 AND 3)

Figure 2:
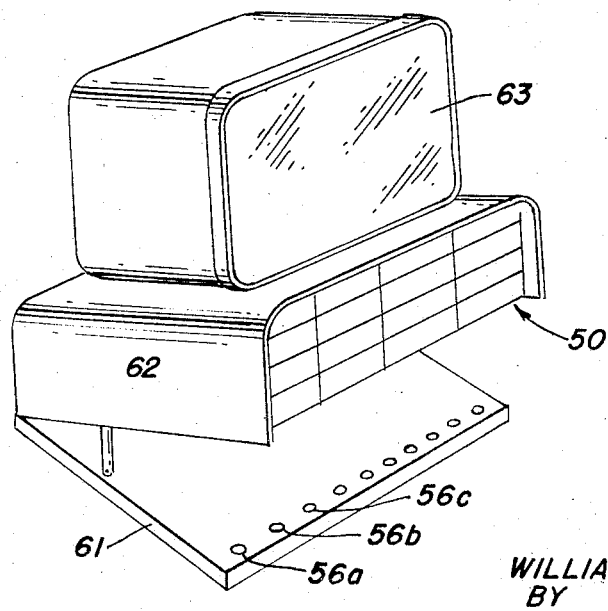
FIG. 2 is a view in perspective of a control panel which may be employed in the invention.
Figure 3:
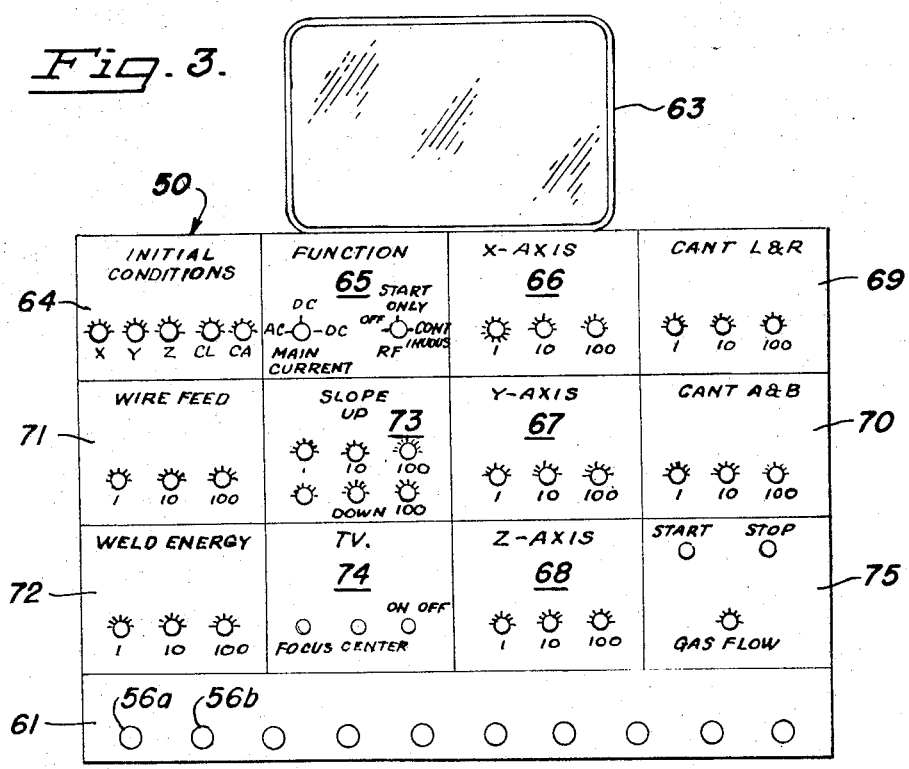
FIG. 3 is an enlarged view in front elevation of the face of the control panel of FIG. 2.

A typical control panel 50 for a system of this invention is shown in FIGS. 2 and 3. As shown in FIG. 2, the control panel 50 may have a base 61 with jog control switches 56a, 56b, 56c, etc., thereon, and a housing 62 is mounted adjacent the base 61 and contains the wiring needed to perform the functions. A closed-circuit television circuit for watching the actual welding may be employed with a screen 63; other instruments may be used for checking weld conditions, but are not shown here.

The panel 50 may have the specific controls shown in FIG. 3. An initial-conditions section 64 enables digital setting of the starting position of the weld head along each of the mutually perpendicular X, Y, and Z axes, and of cant or tilt by rotary amovement about two mutually perpendicular axes—left and right ("Cant L and R" or "CL") and ahead and back ("Cant A and B" or "CA").

A function section 65 enables control of the weld energy characteristics AC, DC+, and DC−, while RF current can be employed continuously, or at the start only, or not at all.

Digital control over weld head movement 51 is provided by five sections, each controlling one type of movement: an X axis section 66, a Y axis section 67, a Z axis section 68, a Cant L and R section 69, and a Cant A and B section 70; each of these sections has a units, tens and hundreds dial, and each dial has ten possible settings.

Similar digital settings are provided for the wire feed control 52 in a wire feed control section 71, and for the weld energy control 53 in a weld energy section 72 and a slope section 73, this latter section having separate dials for "up" and "down" slope settings.

The closed-circuit television for the screen 63 is controlled by a TV section 74, which has standard controls.

A start-stop section 75 not only gives overall control but also enables shielding gas flow to precede or to follow the operation and enables setting of the time of gas flow when it is used.

The mechanics pertaining to the weld head position controls 66, 67, 68, 69 and 70 are explained in detail in the section on the five-axis weld head assembly 100. The point for the present is that the panel 50 provides digital control, whether manually by the dials shown, or by the recorder 54 and repeater 54a, or by the computer 60. Similarly, the wire feed 71, weld energy 72, and slope up and down 73, as well as the initial conditions 64, are all digitally controlled and function on a digital increment basis. The remaining controls 65, 74, and 75 are simpler and more familiar.

THE PULSE SYSTEM THROUGH WHICH THE CONTROL PANEL 50 ACTS (FIG. 4)

The digital control during operation is preferably obtained with the aid of electrical pulses. These pulses are used to operate pulse motors and other pulse-controlled mechanisms that control and impart the needed performance. For example, weld head movement may be accomplished by using five-pulse motors in combination with mechanism enabling superposition of the movements imparted by these motors. An actual example is described later on. One typical pulse motor available on the market turns a shaft exactly $1.8°$ each time it receives a pulse of electric power; hence, 200 pulses turn the shaft one revolution. Through gearing or other transmission shaft revolution may be employed to give rectilinear motion or controlled rotary motion. Using various pulse rates controls speed and the number of pulses controls displacement. Hundreds of pulses may be sent each second for rapid movement and one or two per second for slower movement. When no pulses are sent at all, there is no movement. By sending 200 pulses to the X axis pulse motor, the weld head may be sent along the X axis by whatever distance corresponds to one shaft revolution of its pulse motor. By sending 10 pulses to the Y axis pulse motor, the head may be sent along the Y axis a distance corresponding to $18°$ of revolution of the shaft of its pulse motor. If the 200 pulses to the X axis pulse motor are sent in 1 second, its speed is 10 times as great as if the 200 pulses are spread evenly over 10 seconds. Wire feed rates are accomplished in the same manner by a pulse motor controlling the amount of wire fed, the time when it is fed, and the rate at which it is fed. Weld energy is controlled by pulses in a somewhat different manner, explained shortly.

Each pulse is a unit, and the units are preferably kept quite small. Thousands of units may be needed for a very short portion of the weld program. But each unit is a tiny increment under complete control—digital control. There is no doubt as to the meaning of each pulse applied to each controlling device; it is completely unambiguous, and therefore it means the same thing each time it is repeated. Hence, complex programs, once worked out, can be precisely duplicated any number of times by applying the same number of pulses to the same device at the same rate. Moreover, a computer can adopt or create new programs in a precise duplicatable manner. There is no reliance on approximations or analogues. Digital control is complete and thorough mathematical control. The pulse system enables the application of digital control to welding.

Figure 4:
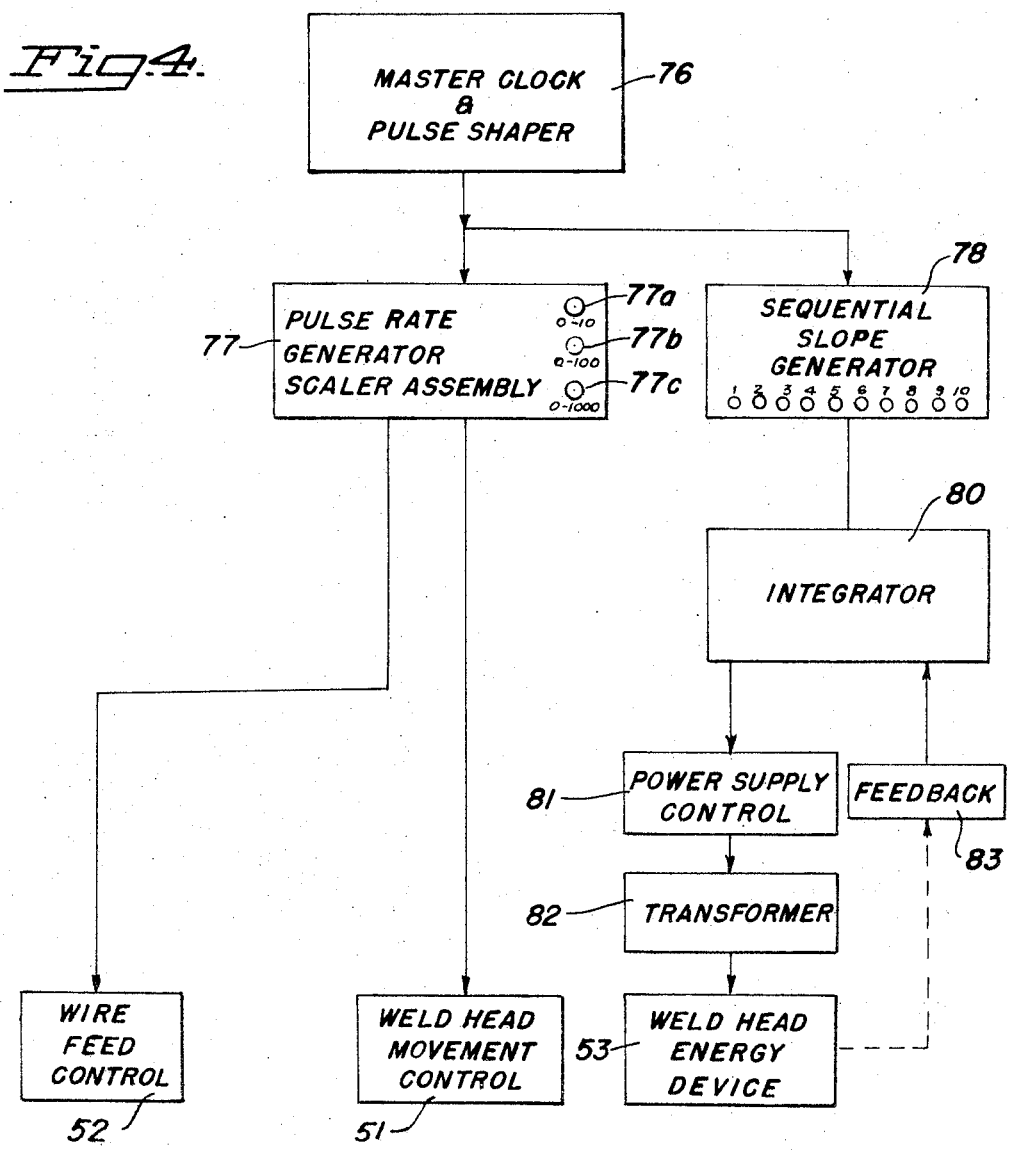
FIG. 4 is a block diagram of a digital pulse control system which may be used in this invention.
Figure 15A:
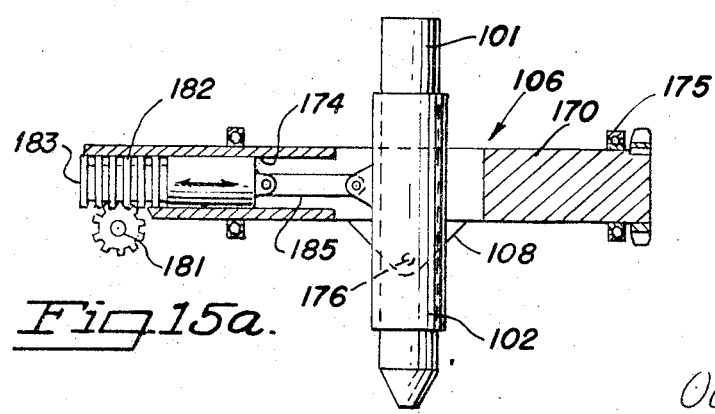
FIG. 15a is an enlarged view in section taken along the line 15a–15 in FIG. 15.

A typical basic digital control system is shown in FIG. 4, though different approaches may be used to obtain the required digital system. A master clock and pulse shaper 76 may produce pulses from a crystal oscillator, which may be standardized with the National Bureau of Standards transmitting radio station WWV. In the device 76 the output from the crystal oscillator or clock is fed to a conventional type of pulse shaper which delivers pulses of whatever height and width are desired. The device 76 produces both basic rapid pulses and regularly spaced control pulses. For example, it may be set to produce 1,000 pulses each second, and it may also be set to produce one control pulse per 1,000 pulses, i.e., one control pulse per second. The control pulse is utilized as an initiation or completion pulse for all the digitally-actuated pulse motors, later to be described.

Two types of device are directly controlled by the master clock 76: a group of pulse-rate generator scaler or rate oscillator 77, and a sequential slope generator 78. In the system, there may be several of any of these devices.

Each pulse rate generator scaler or rate oscillator 77 is a well-known type of device having three decade controllers 77a, 77b, and 77c to enable setting of any integer from 1 to 1,000. In this device, the 1,000 pulse cycle from the master clock 76 is divided by whatever number is set on the scaler 77 to give the quotient as an output pulse rate. Thus, if the scaler 77c is set at 1,000, only one pulse appears at the output for each 1,000 pulses emanating from the master clock 76. A setting of 500 will produce an output of two cycles per second. A setting of 50 on the scaler 77b will give an output of 20 cycles per second, and so on. The pulse rate generator scalers 77 control weld head movement and wire feed, and there may be a separate scaler 77 for each weld movement and another for the wire feed. Each scaler 77 is a digital pulse synthesizer producing a known repeatable, adjustable pulse output, standardized against a known clock standard.

The sequential slope generator 78 is used to vary the weld energy 53. The generator 78 acts as a combination of a stepping switch with a set of subtracting scalers. To explain the subtracter scaler, between successive control pulses, only a number of basic pulses set by decade counters of the subtracter scaler are passed on. Thus, if the decade counter is set at 250, then when a control pulse from the master clock 76 initiates a 1,000 pulse cycle, only the first 250 pulses from the clock 76 pass through the scaler, and then the scaler 77 is triggered to prevent more pulses from passing through it until after the next control pulse. In this example, 750 pulses have been subtracted from each 1,000 pulses. By adding the stepping switch to the scaler, the sequential slope generator changes the number of pulses per second to its output each time there is a control pulse. For example, it may be set for a rise of 100 pulses per step; then after the first control pulse, it will pass 100 pulses in the first second, 200 pulses in the next second, 300 in the third and so on until it reaches a set level, which may be 700 or 1,000 or whatever is desired. Decay works the same way, but in reverse. The increments can be changed, as from 100 per control pulse to 10. The steps may be made nonlinear and unequal, if desired.

The sequential slope generator 78 controls an integrator 80 which is preferably set to provide an integration period of 1 second and to then transmit power equal to the quotient of the pulses received that second, divided by 1,000. If only 500 pulses are fed to it in that second, only 50 percent of the power output from a weld energy supply is sent. Hence, at each step of the sequential slope generator 78, the weld energy is varied.

In the normal case, the control of the weld energy of the power supply may take the form of a variable potentiometer which varies the voltage to a power supply control 81. If the potentiometer is large enough, it may directly control a welding transformer 82, but in most cases the power supply 81 first amplifies the control signal voltage and includes means for varying the transformer output. The control 81 may be a magnetic amplifier, a silicon controlled rectifier, or a DC motor which varies magnetic coupling between the primary and secondary of the transformer 82. The transformer 82 through its internal design converts the line voltage into a required form of weld energy, whether that form be constant potential, constant current, direct current, alternating current, balanced wave, or something else. Normally, in order to hold the weld energy constant, some form of feedback 83 is required. The output from the transformer 82 (voltage and current) is sampled and referenced against the control input signal, and an increment is added or subtracted from this signal before reaching the transformer 82. If, for example, the line voltage to the transformer 82 drops, the output tends to drop, so the feedback 83 senses this, resets the integration rate at the integrator 80, and the integrator 80 then momentarily increases the control voltage to the transformer 82 to bring up its output. When the line voltage returns to normal, the feedback control signal goes to zero, and the control voltage is again the sole control of the weld energy.

DIGITAL CONTROL OF WELD ENERGY BY PULSES
(FIGS. 5—7)

It is important to change the weld energy from zero to a desired welding level at the commencement of each weld operation and to reduce it back to zero at the end of the operation. Different circumstances call for different rates of change—or slope—at both ends, these being the "slope up" and "slope down" of section 73. Generally, the upslope is more abrupt than the downslope.

Analogue devices enable slope up and down along a true line. Digital devices can attain a substantial equivalent by stepwise movement in small increments, and gives a mathematically exact reproduction of the slope. One of the most critical periods of a given weld is the initial weld puddle formation and the removal of weld energy at the end of the weld to allow the puddle to solidify. By the use of digitally controlled slopes, in conjunction with digitally controlled weld energy and motions, precise starts and stops can be accomplished. For example, it is possible to have the weld torch go into a circular motion, say one-half inch in diameter, apply slope weld energy, and have the circular motion reduced in a predetermined Archimedes spiral to the center of the half inch initial circular motion, and at the time when the torch reaches the center to commence forward motion and proceed with the weld. The same type of action may be applied at the conclusion of the weld. It is the purpose of this portion of the explanation to describe how this may be done in the present invention.

Figure 5:
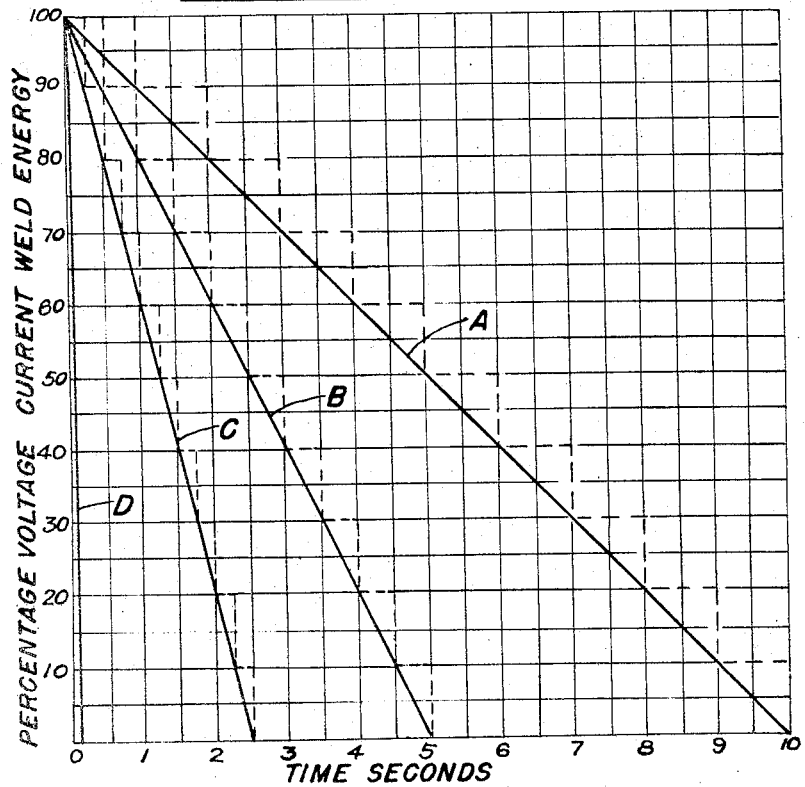
FIG. 5 is a time-energy diagram of some slopes that may be generated by the digital slope generator of FIG. 4.

FIG. 5 illustrates how the rate of change downwardly, the downslope, of the weld energy source may be digitally controlled. The integrator 80 is in this example, arranged by established and well known circuitry so that when 1,000 pulses per second are fed into it, the output signal drives the weld energy source to 100 percent of its output. (If desired, it may integrate at intervals of 10 or 100 or 10,000 or any other number of pulses and at 0.1, .001, or .0001, or any number or fraction of seconds. The 1,000 pulse per second rate is chosen to simplify the explanation.) Any of many decay rates may be chosen; for this example a 10 percent reduction per step is chosen. The vertical scale (Y axis) represents the weld energy of the family of slopes from 0 to 100 percent. The horizontal scale (X axis) represents time from 0 to 10 seconds. The percentage of energy output corresponds to one-tenth the number of pulses to the integrator 80 per second, since 1,000 pulses = 100 percent.

The family of curves A, B, C, and D in FIG. 5 shows various slopes for reducing the weld energy from 100 percent down to 0 percent. Curve A has a 45° slope and is obtained by reducing 10 percent every second, so that it takes 10 seconds to go from 100 percent to 0 percent. Curve B has a slope of 63.5° and is obtained by reducing 10 percent every one-half second, so that 5 seconds are required to reduce from 100 percent to 0 percent, still with the same 10 percent reduction per step.

Curve C has a slope of 76° and is produced by ten 10 percent reductions, one every one-fourth second. Curve D for all practical purposes is a vertical line and results from ten 10 percent reductions occurring every one-thousandth of a second, so that the weld energy control signal is reduced from 100 percent to 0 percent in one-hundredth of a second. The same slopes can be obtained by various combinations of amounts of reduction and time interval between reductions. Of course, different slopes are easily obtainable, whether linear, logarithmic or other.

Figure 7:
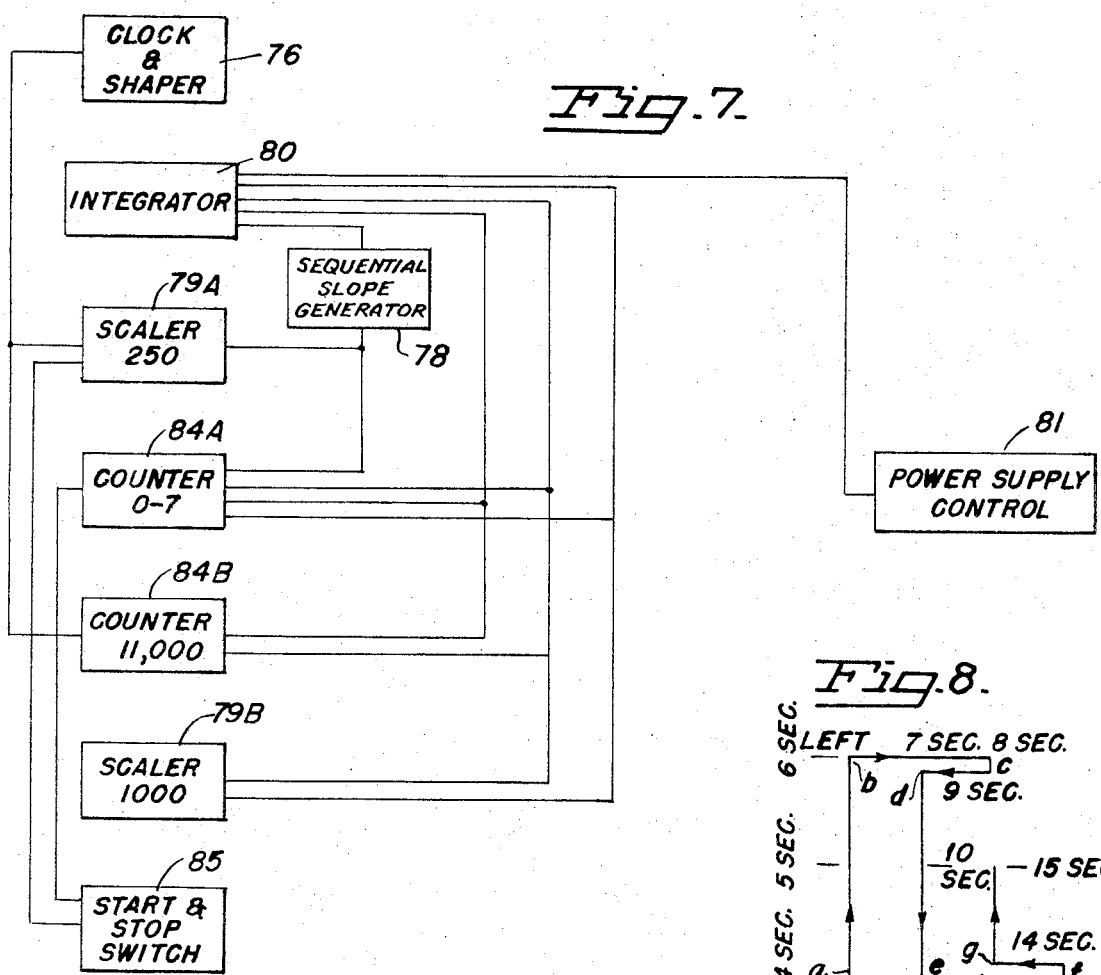
FIG. 7 is a block diagram of the programming subsystem which is used to produce the weld program of FIG. 6.

FIG. 6 shows a simplified weld energy program employing the slope generator 78 in a subsystem shown in FIG. 7. The program is: in the portion E the weld energy is to start at 0 percent and slope up at 76° to 70 percent of full weld energy in 2 seconds by means of seven 10 percent increases, one increase every one-fourth second or every 250 pulses. The weld energy is then to be held constant over portion F at the 70 percent level for 11 seconds, and then the slope-down at portion G is to start and change at the rate of a 10 percent reduction every second or 1,000 pulses, a 45° slope, reaching 0 in 6 seconds.

The subsystem of FIG. 7 includes a first subtracter scaler 79A to provide an impulse after every 250 pulses or one-fourth second, a first counter 84A set to count seven spaced trains of pulses and then provide a completion pulse, a second counter 84B set to count 11,000 pulses (11 seconds), and then a second scaler 79B set to provide an impulse after each 1,000 pulses (1 second), and a stop-start switch 85. It also includes a sequential slope generator 78 which charges in increments of 100 (in this example) the number of pulses supplied to the integrator 80, at each actuation of the generator 78.

When the start switch 85 is closed, an initiating control pulse from the master clock and wave shaper 76 triggers the first scaler 79A. After the first scaler 79A has received 250 pulses, it in turn produces a triggering impulse which triggers the first counter 84A and the sequential slope generator 78. The generator 78 then supplies pulses at the rate of 100 per second to the integrator 80, which in turn drives the power supply control 81 at a rate of 10 percent and holds at this rate until it receives the next triggering impulse from the first scaler 79A. When the first scaler 79A has counted a second group of 250 pulses, it supplies a second trigger impulse, and the sequential slope generator 78 then supplies 200 pulses per second to the integrator 80, which then drives the power supply control at a 20 percent rate. This process repeats until the first counter 84A has received seven impulses from the first scaler 79A, at which time it delivers a completion pulse to the scaler 79A and to the second counter 84B and resets itself to zero. The integrator has then reached a rate of 70 percent of maximum and it holds at the 70 percent rate while the second counter 84B counts. When the second counter 84B has received 11,000 clock pulses, it supplies a completion pulse which triggers the first scaler 79A, reverses the pulse sequence train of the sequential slope generator 78, and triggers the second scaler 79B. When the first counter 84A, reset at the time of delivering its completion pulse, counts one, the sequential slope generator 78 is actuated to deliver 600 pulses per second to the integrator 80, which therefore reduces the power from 70 percent to 60 percent of maximum. Each time the second scaler 79B counts 1,000 pulses, it supplies an impulse pulse which triggers the slope generator 78 and the first counter 84A. The sequential slope generator thus moves down stepwise, supplying pulses at rates of 500, 400, 300, 200, and 100 pulses per second, as the first counter 84A counts, reducing the power in 10 percent increments in 1 second steps. When the second scaler 79B has delivered seven impulses to the first counter 84A, it then supplies a completion pulse, triggers the stop switch 85 to the "off" position, and the weld program of FIG. 6 is completed.

A SIMPLE PROGRAMMED CYCLE OF WELD HEAD MOVEMENT (FIGS. 8–10) a

Figure 8:
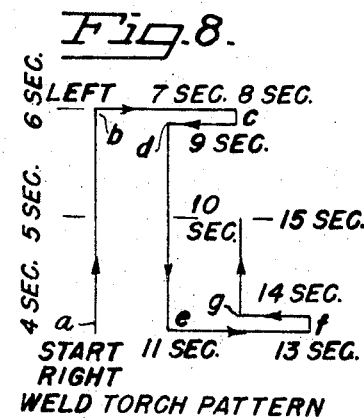
FIG. 8 is a top plan view of a simple weld-torch movement pattern which can readily be programmed by the present invention.
Figure 11:
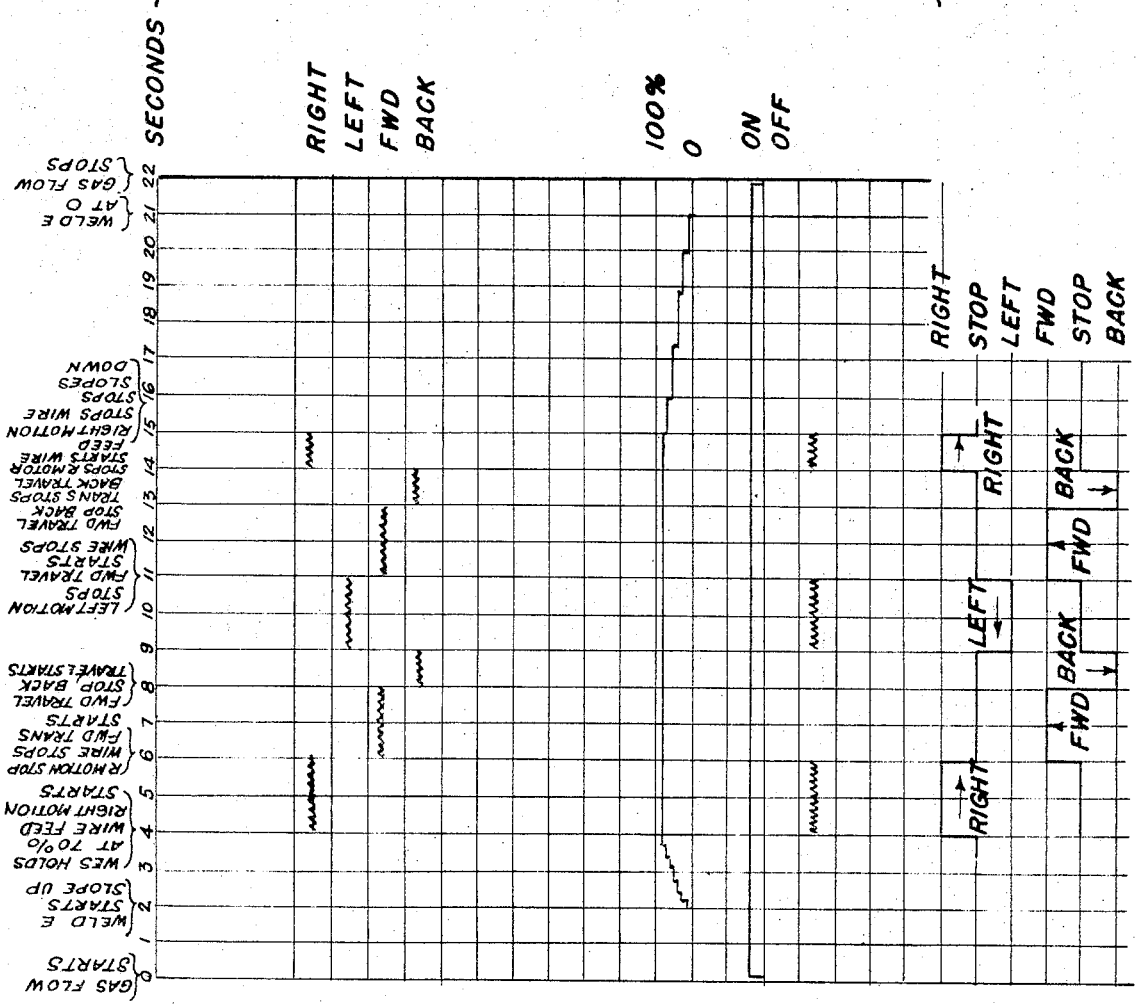
FIG. 11 is a different type of time-function diagram of the same weld pattern as FIGS. 8—10, relating it to the apparatus by which it is achieved and showing also the coordination therewith of weld energy, wire feed, and gas shielding.

A series of pulse rate generator scalers 77, under the control of the panel 50, are used to control the various movements of the weld head through pulse-operated motors. An important type of weld pattern is shown in FIG. 8. Although this movement pattern is shown only in two dimensions on a plane (and therefore not requiring any canting or tilting or Z axis motion), it illustrates some of the principles of the invention. The pattern of FIG. 8 is for a basic seam weld. It is achieved by (1) movement two steps from right to left across the seam, followed by (2) movement two steps forward, succeeded by (3) motion back one step and then (4) movement two steps across from left to right followed by (5) movement forward two steps, (6) movement back one step and (7) movement one step from right to left and stops (or the cycle may be repeated, even continuously along the full length of the seam.) The purpose of the movement forward by two steps and then back one (movements 2, 3, 5 and 6 above) is to provide more weld energy at the side of the weld for controlled penetration, fusion, tempering of the adjacent heat affected area, etc. As shown in FIG. 11, wire is fed into the weld puddle only on the lateral movement (movements 1, 4 and 7 above).

While a jig could be made to accomplish this weld by analogue means, that would not take care of all the factors involved, and illustration of how the digital pulse system controls this operation will illustrate the basic operation of this invention. Also, the ability of the invention to vary any step of the operation or to change them is apparent.

Figure 9:
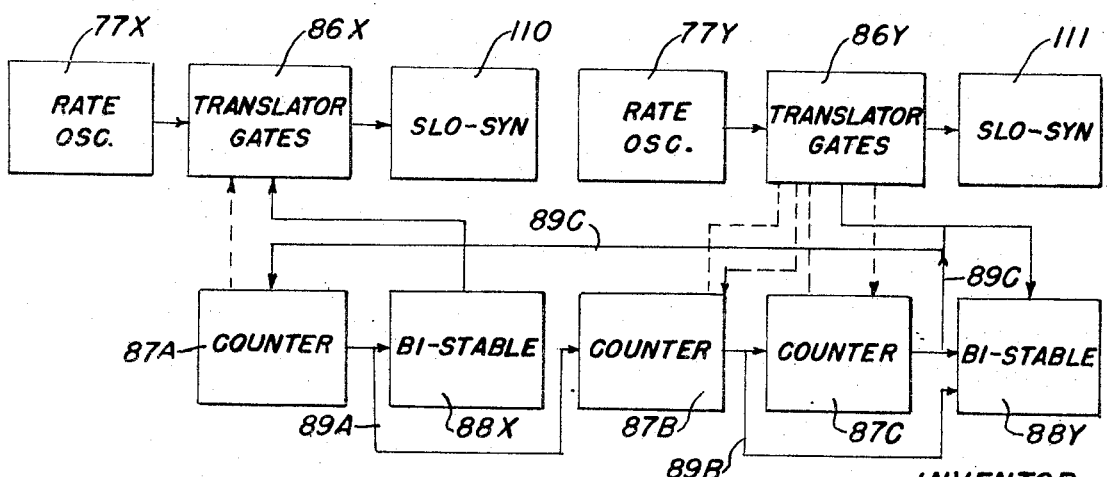
FIG. 9 is a block diagram of a pulse control subsystem for weld head movement applied to two mutually perpendicular directions of movement for a uniform seam weld, capable of performing the program of FIG. 8.

As shown in FIG. 9, pulse-operated motors 110 and 111 which control the actual movement of the welding head (as described later) are controlled by separate rate oscillators 77X and 77Y, which operate through associated translator and gating devices 86X and 86Y. Three pulse counters 87A, 87B, and 87C work in conjunction with two bistable switches 88X and 88Y to accomplish the changes in movements.

The rate oscillator 77X sends pulses to the motor 110 through the translator 86X, which forms and shapes the pulse required to drive the motor 110. Each pulse rotates the armature of the motor 110 a certain increment in one of two directions, either clockwise or counterclockwise, according to the status of the bistable switch 88X. The rate oscillator 77Y sends pulses to the motor 111 through the translator 86Y, and each pulse moves the motor 111 a predetermined increment either clockwise or counterclockwise depending on the state of the bistable switch 88Y. The rotation of each motor 110 and 111 is converted into rectilinear motion of the weld head by a suitable gear train, the motor 110 driving the weld head to the left or to the right, while the motor 111 drives the weld head forward or back.

Referring to all of FIGS. 8, 9 and 10 simultaneously, the cycle is as follows:

1. The cycle begins with transverse motion of the head from the right at a to the left at b (FIGS. 8 and 10), and the rate of motion is a function of the rate of oscillations from the scaler 77X, which are supplied to the motor 110 via the translator 86X.

2. The end of the lateral motion at b occurs when the counter 88A counts a predetermined number of pulses set on the control panel 50, at which time a completion pulse 89A is delivered.

3. The pulse 89A resets the bistable switch 88X to change the direction of potential transverse motion of the motor 110 and also acts on the translator 86X to stop delivering pulses to the motor 110. 4. The pulse 89A also triggers the counter 87B, and forward travel of the weld head from b to c starts by the counter 87B acting on the translator 86Y to send pulses from the oscillator 77Y to the motor 111.

5. At the end of its count, the counter 87B delivers a completion pulse 89B which triggers the bistable switch 88Y, to reverse the direction of potential travel of the motor 111, and at the same time also acts on the translator 86Y to stop the pulse output to the motor 111.

6. Also, at the same time, the pulse 89B triggers the counter 87C, and the counter 87C takes over the translator 86Y and sends output from the pulse generator 77Y to the motor 111, which now moves the weld head backward from c to d.

7. At the end of its count, the counter 87C delivers a completion pulse 89C which triggers the bistable 88Y to place the motor in a state prepared for its next forward motion and stops the motor 111.

8. The pulse 87C also triggers the counter 87A, and motion of the head to the left starts, moving it from d to e.

9. Forward movement from e to f and backward movement from f to g follows just as in paragraphs 4—6, and then the cycle begins over.

Figure 10:
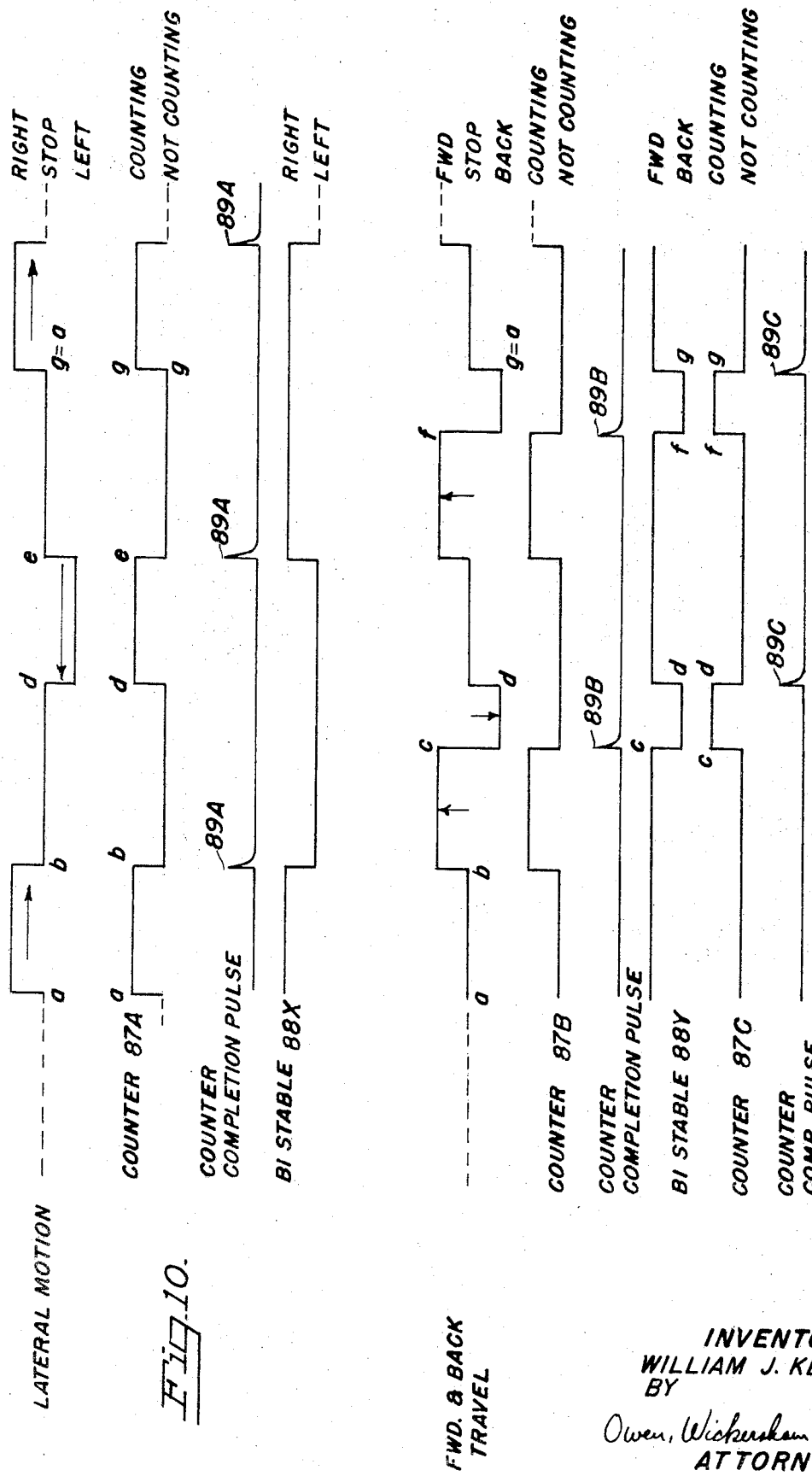
FIG. 10 is a time-function diagram of the pattern resulting from use of the FIG. 9 device in the FIG. 8 program.

Thus, the pattern of FIG. 8 is produced, FIG. 10 showing the full timing of the counters, their pulses, the bistables, and the movement of the weld head.

A COMPLETE PROGRAM FOR THE SIMPLE CYCLE OF FIGS. 8—10 (FIG. 11)

In FIG. 11, wire feed, gas shielding, and weld energy are related to the seam program of FIG. 8—10. Along the left side of FIG. 11, are the weld parameters to be controlled. The applied logic comprises the necessary electrical building blocks for converting the type of computed output to be received and understood by the various parameters. The chart shows the interrelations of many channels; in performing the simple weld and weld patterns of FIG. 8 not all of these channels are used.

The weld head movement, as shown here, does not start until proper weld conditions are obtained. First, at time 0 seconds gas for shielding begins to flow. At time 2 seconds, the weld energy begins to slope up, reaching its desired 70 percent level at 4 seconds. At 4 seconds, wire feed begins and lateral movement simultaneously takes place for 2 seconds. At 6 seconds wire feed stops, at the same time as the stopping of lateral movement. Wire feed does not take place during the forward-and-back preheat movement. At time 6 seconds the forward preheat movement begins, followed by back preheat movement at time 8 seconds. At time 9 seconds, wire feed begins again with lateral movement in the opposite direction. Then wire feed and lateral movement stop at time 11 seconds. Forward preheat movement begins at 11 seconds followed by backward preheat movement at time 13 seconds. At time 14 seconds, wire feed begins again during a 1second lateral movement only to the center line. There motion stops, and at time 15 seconds weld energy is reduced gradually to zero at 21 seconds, and at time 22 seconds the gas flow is stopped.

That the operation could be much longer and more continuous is apparent. That it could be much more complex is indicated by the complete inactivity during this cycle of three weld head movements: Z axis and both tilting movements.

With this introduction and consideration of pulse production and employment, it is time to consider the mechanical features which carry out weld head movement in response to the transmitted pulses.

A FIVE-AXIS WELD HEAD ASSEMBLY 100 (FIGS. 12—15)

The weld head assembly 100 is actuated and controlled by digital pulses to move a welding torch 101 in five basic axes of motion and in combinations thereof to simulate all of the movements normally employed by the human hand.

Figure 13:
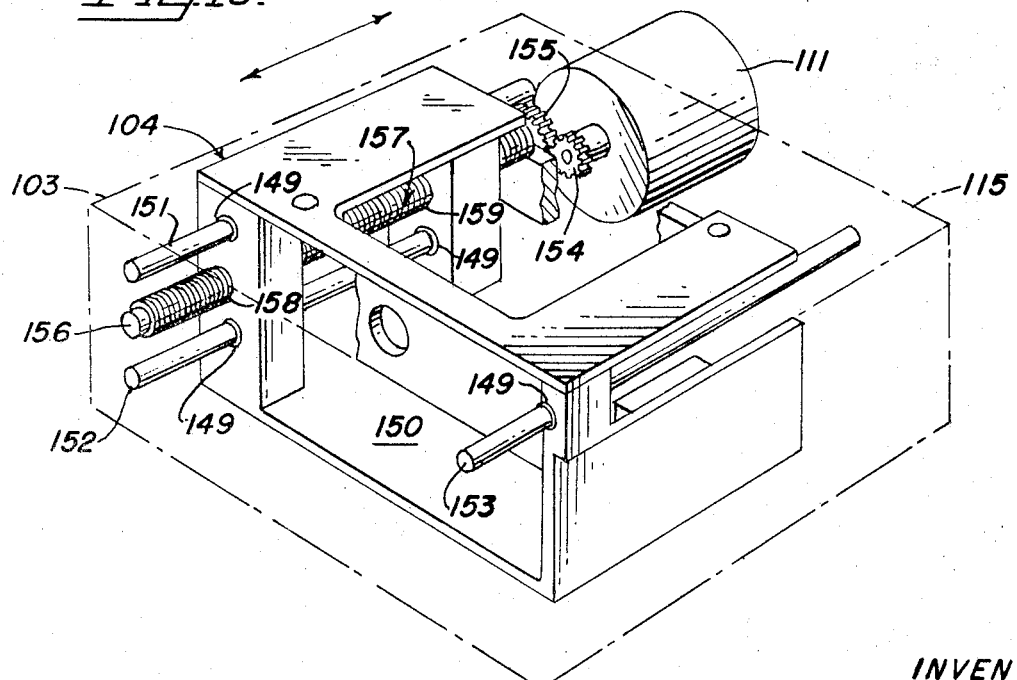
FIG. 13 is a view in perspective of a portion of the weld head assembly of FIG. 12 with some parts removed to show better the subassembly elements which move the torch to the right and left.
Figure 14:
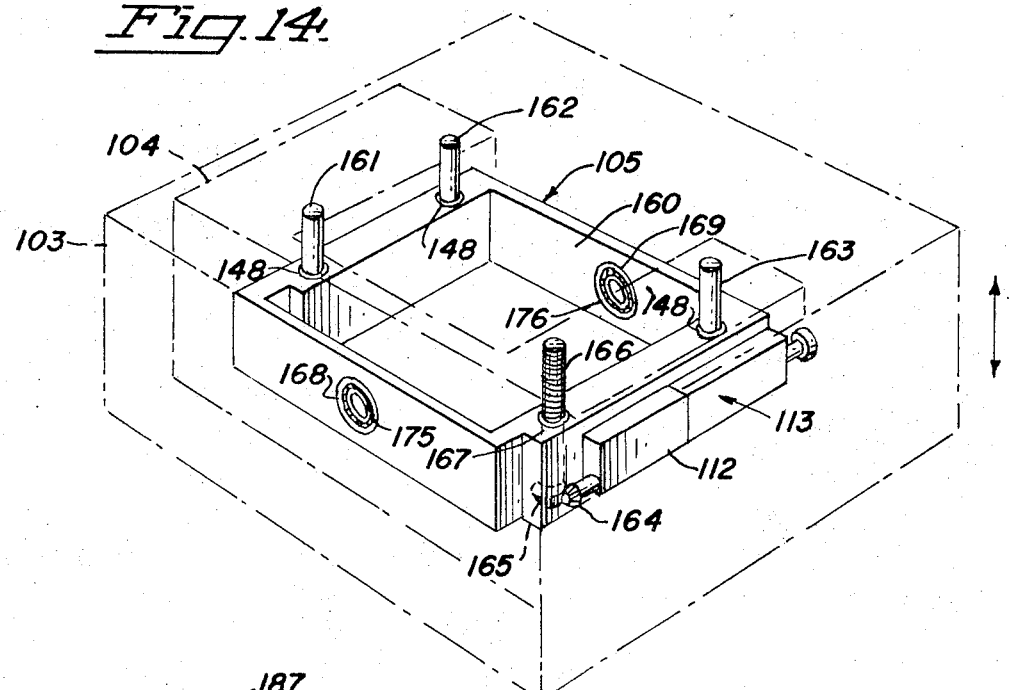
FIG. 14 is another view in perspective, partially in phantom and with some parts removed, to show the subassembly controlling the third axis of motion, that of the up and down movement, which raises and lowers the welding torch.
Figure 15:
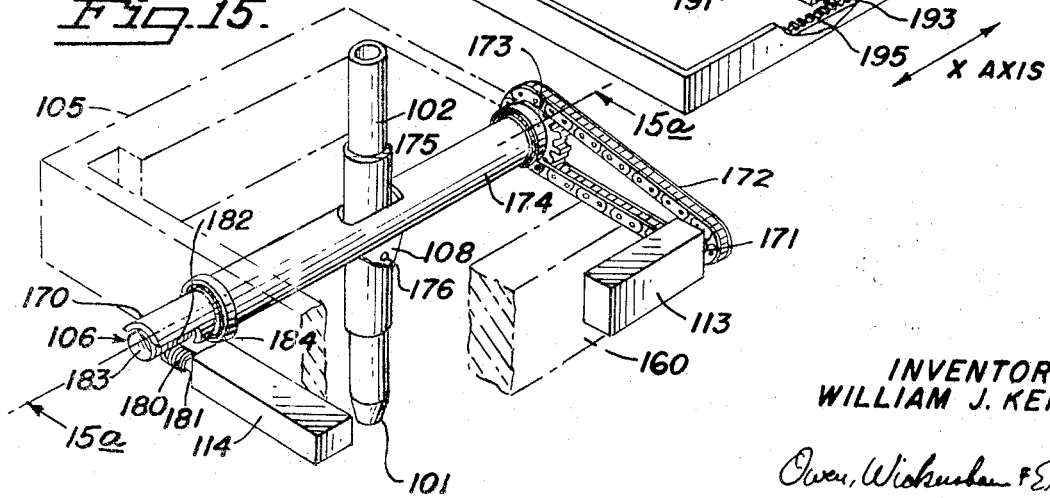
FIG. 15 is a further view in perspective of a portion of the head of FIG. 12 showing the electromechanical subassemblies giving impetus to the fourth and fifth axes of movement, namely, canting the weld torch forward and back and tilting the weld torch left and right.

The self-contained weld head assembly 100 comprises a welding torch 101 (See FIG. 15) held in a torch holder 102 and four electromechanical subassemblies 103 (FIG. 12), 104 (FIG. 13), 105 (FIG. 14), and 106 (FIG. 15), each (except subassembly 106) controlling a single basic axis of motion of the torch holder 102 or of the torch 101, the subassembly 106 combining two motions. The subassemblies are interconnected to a torch holding yoke 108 (FIG. 15) in such a manner that their individual movements, acting in concert, direct the yoke 108 in a guidance path which is a vectorial composite of these individual lines of movement.

All movement in the device is accomplished through the use of digital pulses applied via an electrical central cable 109 to pulse motors 110, 111 (FIG. 12), 112, (FIG. 14) 113 and 114 (FIG. 15), from separate pulse rate generator scalers 77 or stored memory 54A computers 60 etc. A typical commercial pulse motor which may be utilized in the various subassemblies turns a shaft 1.8° per single input pulse. This means that 200 pulses turn the motor drive shaft 360° or one revolution. Precise and accurate change in the directed path of the torch holding yoke 108 is accomplished by varying the pulse input (as already described) to the five motors 110, 111, 112, 113 and 114, which drive the basic movement producing subassemblies 103, 104, 105, and 106. Prescribed pulse input signals can be introduced in an infinite number of fixed or varying combinations into the system whether manually, by the recorder 54 and repeater 54a, by the computer 60, or by punched tape, etc., or by manual only.

The weld head assembly 100 includes a rectangular box 115 (FIG. 12), which may be aluminum and may typically be about 9 inches × 9 inches × 4 inches in size. The box 115 has a central rectangular opening or welding well 116, which may be about 2 inches × 3 inches × 4 inches. The torch holding yoke 108 is positioned within the welding well 116. Coolant ducts (not shown) are preferably patterned in grids and honeycomb the walls 117 (See FIG. 17) of the welding well 116 and a bottom plate 118 (also shown in FIG. 17) of the box 115, which is shaped like a square doughnut, to provide cooling action for the surfaces exposed to the heat of the torch 101. Wire 255 from a device like that in FIG. 22, shielding gas via a conduit 204, and weld energy via a conduit 120 are supplied to the assembly 100.

A typical attachment for straight line welding (either on flat sheet or around a pipe), includes two toothed tracks 121 and 122 (FIG. 12) spaced parallel to and equidistant from the center of the weld line 140 and the weld well 116. Two sets of drive gears 123, 124 mesh with the tracks 121 and 122 and serve to move the box 115 along the tracks in such a manner that the welding well 116 is positioned directly over the weldment line 140.

Forward and reverse movement is effected by the electric stepping motor 110 acting in response to a pattern of digital electric pulses fed to it by the weld head control panel 50, section 67. For example, one positive digital pulse may turn a drive shaft 125 by 1.8° in the clockwise direction, while a negative pulse may turn it 1.8° in the counterclockwise direction. Drive sprockets 126 and 127 may be used to transmit the rotation of the drive shaft 125 through chains 128 and 129 to drive sprockets 130 and 131. The sprockets 130 and 131, in turn, may drive the toothed gears 123 and 124, which together ride on the toothed tracks 121 and 122. In the case of circumference welding of pipe, the two geared tracks 121 and 122 preferably fit as collars parallel to the weldment line extending around the pipe (See FIG. 34).

Positive contact with the toothed tracks 121 and 122 and the maintenance of a fixed horizontal attitude of the weld box 115 to the tangential plane of the weld point may be provided by two balancing sprockets 132 and 133 on each side of the box 115, acting as balancing slave gears on either side of drive gears 123 and 124. When the box 115 is subjected to gravity pull that would cause it to fall off the track (as when passing around the circumference of a pipe) a retainer chain 134, running in a milled slot 135 in each geared track 121, 122 may be looped over a keeper sprocket 136. Chain snugness may then be provided by adjusting a setscrew 137, which, in turn, acts on the up and down positioning of the keeper sprocket 136 in a slot 138.

When making circumference welds on pipes of varying diameters, adjustment to the balancing sprockets 132 and 133 is necessary to maintain the box 115 in an attitude tangential to the pipe. This may be accomplished by mounting the balancing sprockets 132 and 133 on adjustable elbow arms 140 and 141, which are hinged to the box 115 on pivots 142, 143 at one extremity and have slots 144 at the other extremity.

A setscrew 145 positioned in each slot 144 may be used to fix the position of its elbow arms 140 and 141 and hence of the balancing sprockets 132, 133. When welding small diameter pipe, in order to maintain a true tangential attitude of the weld box 115 to the point of weld, the balancing sprockets 132, 133 are positioned well below the horizontal line running through the drive gear 123.

The subassembly described, in effect, provides in digital increments, positive straight line motion of the box 115 in either a forward or reverse direction (Y axis). Precise and accurate movement—continuous or spaced, fast or slow—is accomplished by prescribing and directing digital electric pulses in various combination and rates of flow from the control panel 50 to the digital pulse motor 110.

Right and left movement (see FIG. 13) is controlled by the assembly 104 and may be imparted to a movable platform 150 which is affixed within the weld box 115. Three shafts 151, 152, 153 are journaled in bearings 149 may be press-fitted into the walls of the support platform 150. Right and left movement of the platform 150 is then accomplished by digital electric pulses supplied to the drive pulse motor 111. A negative digital pulse may turn the pulse motor 111 drive shaft 1.8° in one direction, and a positive digital pulse may turn it an equal rotational distance in the opposite direction.

A drive gear 154 is fixed to the shaft of pulse motor 111 and engages a driven gear 155 mounted at one end of a shaft 156 of a screw 157. As the screw 157 is rotated, it passes through threaded openings 158 and 159 in the platform 150, which, in turn, glides back and forth on the shafts 151, 152 and 153. As the polarity of the digital pulses dispatched to the drive motor 111 changes, so does the rotational direction of the screw 157. Right and left movement of travel of the platform 150 is thereby accomplished. Thus, the same pinpoint accuracy of movement as that described for the subassembly 103 is accomplished in the subassembly 104 by the same use of digital pulses being fed to the digital motor 111, which, in turn, furnishes driving force, in microscopic increments, to the right and left movement of the platform 150.

Up and down movement is done by the subassembly 105 (see FIG. 14) and may be imparted to the welding torch through a unique positioning and movement action of a platform 160. This platform 160 may be mounted on three shafts 161, 162 and 163, journaled in bearing 18, which may be press-fitted into the frame of the platform 150. Vertical motion of the platform 160 is then accomplished by the digital pulse drive motor 112. Like the motors 110 and 111, the direction of shaft rotation of this motor 112 varies with the polarity of its energizing pulses. A drive pinion gear 164, attached to the shaft of the pulse motor 112, may engage a driven pinion gear 165 at one end of a screw 166. Rotational movement of the drive motor 112 is thereby transmitted to the screw 166, which turns within a screwball nut 167 fixed to the frame 160. As the screw 166 turns, the platform 160 glides up and down the shafts 161, 162 and 163. Within the sides of the frame 160 two circular openings 168 and 169 may be provided for receiving ball bearings 175 which support the subassembly 106. As mentioned above, the nesting of the subassembly 105 within the subassembly 104, which in turn, is nested within the subassembly 103, conveys the relative movement action of all three of the subassemblies to any mechanisms attached to the frame 160.

Forward and reverse canting movement and right and left tilting movement are both done by the subassembly 106 (see FIG. 15) according to movement of the pulse motors 113 and 114, which may be secured to the frame 160. A welding torch yoke shaft 170 may be positioned within the openings 168 and 169 on the frame 160 and supported by the ball bearings 175. In addition to inheriting the respective relative movement actions of the three subassemblies 103, 104 and 105 described previously, the subassembly 106 makes possible fourth and fifth lines of movement—that of canting the weld torch yoke 108 in a forward and reverse direction about a horizontal X axis and of tilting it to right and left about a horizontal Y axis.

Impelling force for the canting movement is furnished by the digital pulse motor 113 which converts digital energy into rotational shaft movement. Like the other digital pulse motors employed in this invention, positive electric pulses turn its shaft in one rotational direction and negative pulses turn it in the other. In this case, rotational movement of a sprocket 171, fixed to the shaft of the digital pulse motor 113, may be conveyed via a chain 172 to a sprocket gear 173. The sprocket gear 173 may be keyed to the shaft 170, which rotates within the pressed-fit ball bearings 175. As the shaft 170 turns, the welding torch yoke 108, which is fastened to the shaft 170 at a pivot 176, is canted in a forward or reverse direction, depending upon the polarity of the digital pulses being conveyed to the motor 113.

Right and left tilting movement is done by the pulse motor 114, acting through a novel electromechanical mechanism installed in a hollow portion 174 of the shaft 170. The digital pulse motor 114 conveys rotational and counterrotational energy to a pinion gear 180 mounted on a shaft 181. The pinion gear 180 may engage parallel rotary race rings 182 turned into a solid insert plunger shaft 183. The hollow shaft portion 174, into which the solid plunger shaft 183 is inserted, may be cut away at 184 in such a manner to enable the pinion gear 180 to engage the milled race rings 182 on the plunger shaft 183 and force the plunger shaft 183 either away or toward the welding torch holder 108, the direction of motion being determined by the pulse polarity supplied to the digital motor 114 and the resulting rotation of the pinion gear 180. The plunger shaft 183 is pivotally joined to a connecting rod 185, which, in turn, is pivotally linked to the welding torch holder 108. As horizontal directional force is exerted within the hollow of the yoke shaft 170 by the plunger assembly, the torch holder 108 tilts about its pivots 176, either to the left or right about a horizontal Y axis—depending upon the directional force exerted.

FLAT PLANE PRODUCTION WELDER (FIG. 16)

Figure 16:
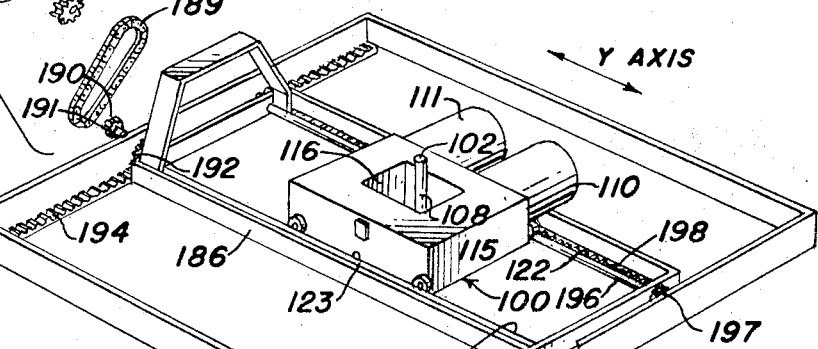
FIG. 16 is a partially exploded view in perspective of the weld head assembly of FIGS. 12—15 used on a flat plane, repetitive welder frame, some parts being omitted for the sake of clarity.

FIG. 16 illustrates how the automated weld head 100 can be utilized for repetitive welding in a flat plane. The weld head assembly 100 is here mounted on a combination frame assembly 186 that moves in X and Y axes. A programmed pulse motor 187 drives a sprocket 188 which in turn drives a chain 189 that drives a sprocket 190 keyed to a shaft 191, which extends the length of the inner frame 186. Pinion gears 192 and 193 keyed to the shaft 191 mate with racks 194 and 195. A similar shaft 196 paralleling the shaft 191 on the other side of the frame has pinions 197 that also engage the racks 194 and 195. Therefore, as the pulse motor 187 rotates, the weld head 100 moves back and forth along the X axis.

Figure 12:
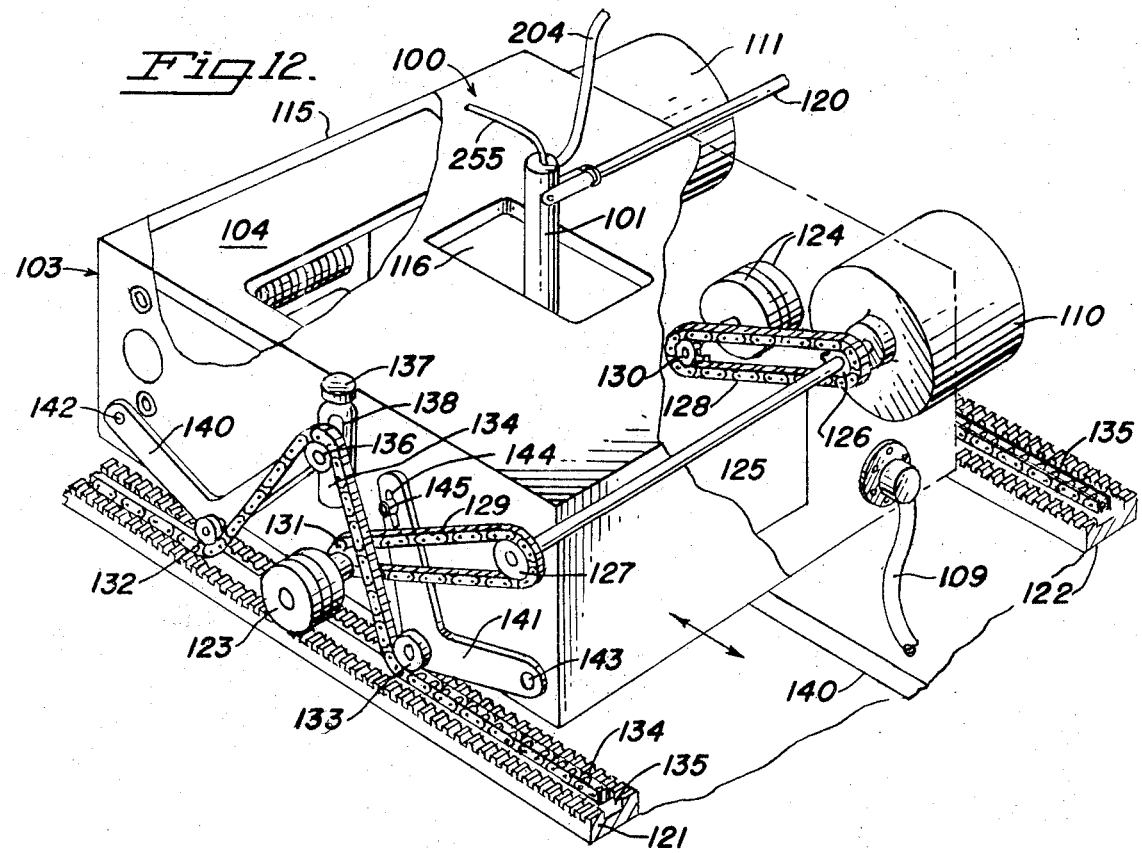
FIG. 12 is a view in perspective of a weld head assembly embodying the principles of the invention, partially cut away to show those subassembly parts and mechanisms imparting to the torch forward and reverse movement, relative to the weld line.

The pulse motor 110 rotates the weld head drive gears 123 (and 124, not shown in this view) which mate with the racks 121 (not shown here) and 122 (Cf. FIG. 12). Therefore, as the pulse motor 110 rotates, the weld assembly 100 moves back and forth along the Y axis. Balancing wheels 177 and 178 on both sides of the box 115 replace the shafts 142 and 143 to maintain support and alignment of the box 115. The pulse motor 111 moves the weld torch 101 in the X axis within the confines of the weld head 100 and carries out the actual oscillating weld function. The pulse motor 187, while capable of duplicating the motion of the pulse motor 111 is used primarily for indexing the weld head in the X axis along the racks 194 and 195.

In operation, the rack frame 186 is placed over and surrounding the area in which welding is required, the weld head 100 being referenced for the initial point of starting weld. For example, a weld assignment to weld a 45° butt weld from the lower left to the upper right can be accomplished by feeding the same number of pulses to the pulse motors 110 and 187, moving the head 100 at a 45° angle. By properly relating the pulses to the motors 110 and 187, circles or any other configuration can be welded. This feature has particular application for welding heat exchange tubes to tube sheets in the fabrication of heat exchangers.

Within the confines of an X-Y plane, Z axis motion may be provided for welding shapes that diverge from a flat plane, and the cant and tilt may also be included, for example, in welding an airplane wing.

Consider now a butt well in the horizontal position. The distance across the weld, which may be 1 inch, may be divided into 10 equal spaces. The gearing of the motor 110 may be such that one pulse or 1.8° moves the torch 101 one-tenth of an inch; therefore, for the torch 101 to move from one side of the weld to the other side in 10 seconds, the motor 110 is fed 10 positive pulses at the rate of one pulse per second. In this example, the torch 101 moves in one-tenth of an inch increments, 1 second apart and scans the weld, taking 10 seconds to reach the right-hand side. For the torch to return to the left-hand side in 20 seconds, 10 negative pulses may be fed to the motor 110 at the rate of one pulse every 2 seconds. Any pulse rate may be used and any scanning rate can be produced, and the torch travel can be made to travel any distance by varying the number of pulses. This basic illustration shows how motion can accurately be defined and reproduced. The accuracy of the motions of the weld head are inherently as accurate as those of an electric clock. Therefore, the device can be used to weld complex irregularly shaped objects, such as on an airplane wing, and it can be used repeatedly. Machines programmed by digital memory located hundreds of miles apart can reproduce the same welding program and weld patterns.

One of the most difficult motions to standardize and reproduce in a welding device is the motion along the weld. However, utilizing interrelating triggering pulses, the forward and back motion along the weld and the oscillation across the weld can be so pulsed to reproduce the linear, nonlinear, logarithmic, sinusoid, or any combination of mtions, to duplicate the intricate weaving patterns necessary to hold a weld puddle in position in any plane of welding.

SHIELDING THE WELD (FIGS. 18 —18)

When a conventional welding nozzle is positioned over an area to be welded, gas is introduced into it with sufficient pressure and flow to engulf the area immediately around the weld energy device. If the nozzle's forward motion is quite rapid, the area behind the weld remains at a highly elevated temperature, and oxidation can occur.

In the present invention, the base plate 118 of the weld head assembly 100 preferably has a weld cavity 119 in the middle of the weld head, with substantial areas around the cavity where the nozzle is located, the shielding gas being able to escape only around the edges. A very effective shielding of the area affected by the high temperature of the weld can be achieved by a framelike shield 200 (see FIG. 17) mounted on a base plate 118 of the box 100 and having a suitable projection 201 going into the seam 202. The shield 200, physical in nature, like a wall around an enclosed area, prevents any external air from reaching the welding area, and also reduces the required flow of shielding gas, entering here through a conduit 204. By increasing the area covered or engulfed by shielding gas and enabling the metal behind the weld to cool to a lower temperature, oxidation will be reduced, a desirable feature for many exotic metals. External shielding also prevents any wind or drafts from blowing into and fogging the arc.

The same base plate 118 and weld cavity 119 can be provided with different shields for different situations. FIG. 18 shows the weld head 100 mounted on a relatively large diameter pipe 205 with a shield attachment 206 having a lower edge configuration conforming to the external shape of the pipe. In the base of the plate 206 there may be a mechanical sealing element, such as a metal shoe, or steel wool. The shielding gas here enters through a tube 207.

FIG. 19 illustrates how, when the nature of the metal being welded produces a toxic gas, the area under the weld head and cavity may be exhausted by an exhaust system employing a wraparound type of shield 210 which can completely encompass the pipe 211 or other configuration to be welded. The lower half of the shield 210 may have a pivot 212 to enable installation and may be closed by a lock or latch (not shown). The crack between the upper and lower halves of the case can be tight-fitting mechanical seal 214, and a rotary seal 215 enables the whole assembly to rotate around the pipe 211.

At the present state of the art, weld porosity is related to the pressure surrounding the weld. It is currently believed that porosity is caused primarily by hydrogen or other gas entrapped in the form of bubbles in the weld. Therefore, the higher the pressure the smaller the bubbles, and conversely, the lower the pressure, the larger the bubbles. In order to reduce porosity, the case surrounding the workpiece in conjunction with the weld head may be pressurized. This same assembly 210 may also be used to make a weld under water, provided that sufficient pressure is maintained inside the case to prevent water from entering the case. The same case may also be utilized for making welds in a vacuum, such as in outer space. As shown in FIG. 20, the weld head 100 may be mounted on an X-Y axis device inside and completely shielded by a glass cylinder or dome 216, on top of a base 217 arranged so that a controlled atmosphere can be provided within an enclosure 218. Thus an electron-beam welding device can be used in its required vacuum, and other devices may be used in vacuum or in a special atmosphere.

VIEWING THE WELD ACTION (FIG. 21)

Because the weld head 100 encloses the torch 101, the usual method of watching the arc action directly through a hood or protective goggles is not possible. However, FIG. 21 illustrates a periscope system which may be combined with the weld head 100 to enable direct visual and remote TV viewing (on the screen 63). The image of a welding arc 220 travels through a filter 221, striking the surface of a mirror 222 set at a 45° angle. The mirror 222 deflects the image upwardly, through an optical device 223, which focuses and magnifies the image. The image then strikes a beam splitter 224, set at a 45° angle, which sends part of the image to a TV pickup tube 225. The rest of the image continues upward and strikes a reflecting mirror 226 set at a 45° angle. The reflected enlarged image may then be impinged on an enlarged ground glass viewing screen 228 on the top face of the weld head box 115. The viewed image can be observed without goggles or hoods because the arc intensity has been reduced by the filter 221. The image viewed on the ground glass is considerably magnified, contributing greatly to visual inspection of the weld puddle.

A tube 227, which contains the optical train, is preferably designed so the images viewed at the TV pickup tube 225 and at the ground glass screen can be rotated independently of each other. Thus, the ground glass viewing screen or the TV camera tube 225 can be positioned any place radially about the axis of the tube 227.

The TV camera 225 makes possible remote viewing at the tube 63, and is especially useful when the weld head 100 is in highly contaminated areas, under water, in outer space, or at other locations not conductive to on-the-spot inspection. This feature also enables a single weld observer to monitor a number of weld operations simultaneously in a central location where TV monitor screens can be mounted in racks.

In addition to feeding back visible signals, the invention, by means similar to those illustrated enables the feedback of infrared radiation, temperature information, and other information indicating puddle size and other characteristics of the weld. Known devices may be used in the manner already described in connection with the feedback members 57 and 58.

PULSE-ACTUATED WIRE FEED DEVICE 52 (FIGS. 22 AND 23)

In describing the relatively simple welding program and procedure of FIGS. 8—11, it was assumed the wire would be either fed to the weld at constant rate or would not be fed at all. However, there are many instances where it is desirable to vary the rate of wire feed, either continually during the feeding time or at certain times within a feeding cycle. For example, in welding across a sizable V-shaped weld, the deposit or filling rates at each side, where the groove is shallow, may be much smaller than in the deeper center portions. In this instance and in many others the ability of the present invention to program and apply varying rates of wire feed, due to the use of digital control of motivating pulses, is significant, as is its ability to synchronize and combine the changes in rate of wire feed with weld head movement and with changes in weld energy applied.

Conventional welding wire feeders are not usually satisfactory with this invention; so the invention includes a unique wire feeder.

In a conventional welding wire feed device, two or more grooved rollers are squeezed down on the wire, by an adjustable spring. Because there is only metal-to-metal contact, spring tension must be high and the wire cross section is usually mashed as it goes through the rollers. This causes excessive wear to a TIG (tungsten inert gas) wire feed tube and, in the case of MIG (metallic inert gas) welding, results in poor electrical contact between the wire and the weld energy power source. Spring tension of these prior art devices is adjusted by thumbscrews; so the force is not readable, and the amount of wire slip is unknown and noncontrollable. The analogue-type drive motor for these wire feeds cannot be reproducibly synchronized with the varying wire needs—as, for example, in the case of Vee joints where, in order to perform superior welds, the needs for filler wire feed rate change between the shoulders and the Vee center.

The present invention provides an improved wire feed device 229 having a digitally controlled pulse-actuated motor 230. The motor 230 drives a lower shaft 231 which is keyed to a timing belt sprocket 232 and drives a gear 233. The gear 233 drives a gear 234 which, in turn, drives an upper timing belt sprocket 235. Two rubber timing belts 236 and 237 equipped with teeth 238, 239 on their inside surfaces synchronize all the sprockets. The lower timing belt 236 drives idler sprockets 240 and 241, and the upper belt 237 drives idler sprockets 242 and 243.

Mating of an upper assembly 244 and a lower assembly 245 is accomplished by four shafts 246, one of which is detailed in FIG. 23. At the top of each shaft 246 is a cap 247 with an inside thread into which the shaft 246 screws. Under the cap 247 is a spring 248. The lower end of the shaft 246 is slotted and engaged in a two-diameter wide opening 250 in a plate 251. Spring tension between the assemblies 244 and 245 is controlled by screwing the shaft 246 in or out of the cap 247, as by a screwdriver slot 252 cut into the butt end of each shaft 246. To lift the upper assembly, cam levers 253 are rotated, and cams 254 press down on the cap 247. This causes the shafts 246 to move down slightly and removes the spring tension from the plate 251, so that the plate 251 can slide toward the drive motor 230, where the larger diameter opening 250 is aligned with the shafts 246. The upper assembly 244 can then be lifted vertically off from the wire 255 feeding between the belts 236 and 237 and through wire feed nozzles 256 and 257. The shafts of the sprockets 240, 241, 242 and 243 are brought through the assembly boxes 244 and 245 through oversize holes. With nuts placed on both ends of the shaft 246, the sprockets can then be adjusted up, down, forward or backward, etc., in relation to one another.

The pulse-actuated wire feed device 229 has many advantages. Because the wire 255 is cushioned on rubber and is gripped positively at six points of contact (or as many points as there is room for) instead of the usual two, wire slip is minimized. All sprockets, driving and driven, turn at the same speed. Wire threading is facilitated by the simple removal of the top assembly 244. The wire feed nozzles 256 and 257 are so constructed that, as wear occurs in one groove between the belts 236 and 237, the wire 255 can be shifted laterally to new positions until the full belt width has been utilized. By adjusting the sprockets 240 and 242 up or down in relation to sprockets 235, 243, 232, and 241, any spool-induced bend in the wire 255 can be removed.

Through the use of the digital pulse motor 230, its known pulse rotation driving the wire feed will give a known delivery rate of wire. By using the controlled slope technique described above, the rate of wire delivery can start slowly, build up to the welding rate, and at the end of the weld made to decay at a declining rate. Synchronization of the wire feed with the varying travel rate of the weld head and its fluctuating demand for weld wire are accomplished by the control panel 50 and control member 52.

SIMPLIFIED WELD HEAD (FIG. 24)

A simplified weld head 300 designed for semiautomatic welding is shown in FIG. 23. The head 300 has a housing 301 equipped with a pulse motor 302 to provide forward and back movement parallel to the Y axis, and a pulse motor 303 to provide right and left movement parallel to the X axis. These are the only motions remotely controlled. Y axis motion may be imparted through pinions 304 driven by the pulse motor 302 and engaging racks 305. Pinions 306 free wheel and are used only for support of the weld head 300.

A shaft 307 may be connected to an inner box (not shown) like the platform 150 of the weld head 100. To this shaft 307 a multiaxis position block 308 may be attached to provide for (a) raising or lowering a torch 310, (b) canting the torch 310 forward or back (relative to the line of weld) or (c) tilting it left or right. By adjusting a nut 311, the block 308 can be moved in and out along the X axis and the torch 310 canted forward or back. A rod 312 attached to the knob 311 passes through the space represented by a slot 313 and screws into a tapped hole in the lower matrix 314 of the block 308. As the knob 311 is turned clockwise, the space in the slot 313 is compressed, and the shaft 307 gripped.

A knob 315 in like fashion may grip the torch 310 for moving the torch up and down in the block 308. A knob 316 may turn an attached rod (not shown) which passes through the block 308 into a tapped hole in the block 308. As the knob 311 is adjusted, the block 308 can be rotated for left or right cant. An internal spline 317 may have three tapped holes 318 for connecting an flexible shaft (not shown) to a power takeoff from the pulse motor 302. The rotation of this flexible shaft is then controlled by the motor 302.

A TYPICAL WELD OPERATION SEQUENCE FOR THE SIMPLIFIED WELD HEAD 300 (FIGS. 25 TO 34)

Assume, by way of example, that the weld head 300 is to weld a circumference joint 320 on a horizontal fixed pipe 321 10 inches in diameter, with a 1 inch thick wall, provided with a V-weld channel 320 with 45° beveled edges 323 and 324. The installation is shown in FIG. 25, with FIGS. 26 to 33 showing what is done. Assume further that the pipe material is aluminum, that argon shielding gas from a tank 326 is used (with controllable pre-post flow) and that a tungsten inert gas (TIG) weld is to be used. A power supply 327 may be AC or DC with adjustable potentiometer control (AC being used for aluminum) and remote foot control override 328 and, for this example, conventional cold wire is used with uniform feed speed.

The weld head controller 350 used in FIG. 25 is a simplified version of the control panel 50 and is illustrated in FIG. 34. It has an X axis section 351 and a Y axis section 352. The X axis section has three decade switches 353, 354, and 355 (units, tens and hundreds) for controlling the rate of movement, i.e., the pulse rate to be fed to the X axis motor 302. Three additional decade switches 356, 357, and 358 are used for setting the amount of total movement, i.e., the number of pulses in movement from one side to the other of the groove 322.

The Y axis section 352 has three rate decade switches 360, 361, and 362. For distance, it has two sets of decade controls: switches 363, 364, and 365 control distance forward, and switches 366, 367, and 368 control distance backward. Also there are three decade switches 370, 371, and 372 to set dwell time between movement forward and movement back.

The controller 350 also has two jog buttons 373 and 374 for X axis movement, and two jog buttons 375 and 376 for Y axis movement. The jog buttons enable the operator to override the settings in the X and Y sections 351 and 352. There are also a start switch 377 and a stop switch 378.

FIG. 35 shows in an enlarged view the simplified weld head 300 with mechanical attachments enabling it to weld around the fixed pipe 321. Two blocks 380 are mounted on the fore-and-aft sides (relative to line of weld) of the weld head box 301. The ends of these blocks 380 are drilled and tapped to receive tightening knobs 381. The four knobs 381 enable four positioning wheels 382 to be lowered into guide collar rings 383 to support the weld head 300 above the pipe 321. The wheels 382 can be adjusted to align the weld head 300 in a position tangent to the point of weld for any size pipe. The rings 383 are split in half and joined back together in order to position them around the pipe 321. Flanges on the wheels 382 prevent lateral motion of the weld head 300 along the pipe 321. Retaining-drive chains 384 seat in a slot milled in the rings 383 and hold the head 300 around the pipe 321. A block 385 is attached to the top of the weld head box 301, and pivoted to the block 385 is a combination shaft arm assembly 386. The vertical raising of the assembly 386 is controlled by a knob 387 and a spring 388. By adjusting the knob 387, the tension on the chains 384 can be adjusted. The chains 384 are driven by sprockets 390, which, in turn, are driven from a mitre gear assembly box 391 mounted in the center of the assembly 386. The mitre gear assembly 391 is powered by a flexible shaft 392 from an internal spline 393 which is connected to the pulse motor 302.

Before beginning the welding operation, the initial conditions are set as follows:

a. The power supply 327 is set for alternating current AC 100 amps, TIG operation.

b. The wire feed rate is set at 1 inch per second.

c. The remote current control (foot pedal) 328 is connected with the start-stop switch.

d. The shielding gas preflow is set for 10 seconds and the postflow is set for 15 seconds.

e. The weld head 300 is placed on the guide collar rings 330 and 331, which are clamped around the pipe 321, at 12 o'clock position and is snubbed down with a retaining-drive chain, not shown.

f. The weld head 300 is manually adjusted by the knob 315 so that the vertical distance of the tungsten electrode 310 is set at the desired arc distance from the root 333 of the groove 322.

g. The tungsten electrode 310 is manually adjusted by the knob 316 to a vertical position and moved to the left-hand side of the V to a point where the weld is to start. The circuitry in a weld head controller 350 is preferably designed so that the torch 310 will always begin its scanning or oscillating movement to the right, along the X axis.

For the actual welding, the following adjustments are then made to the weld head controller 350:

h. X axis "Rate" Adjustment. The oscillation rate (X axis) is set by decade switches 353, 354, and 355. For example, for a desired travel rate of 125 pulses per second, the switch 355 would be set at 100, the switch 354 at 20, and the switch 353 at 5 . The pulse generator, when triggered to do so, will then feed 125 pulses per second to the pulse motor 303 actuating the X axis motion.

i. X axis "Distance" Adjustment. For example, if the X axis oscillation distance of travel is set for one-eighth inch and if the sprocket gearing on X axis motion is such that 1,000 pulses covers 1 inch of travel distance, then the distance decade switches 356, 357, and 358 would be set for 125 pulses.

j. Y axis "Rate" Adjustment. The Y axis decade counters 360, 361, and 362 may be set for 100 pulses per second. Assuming that the drive sprocket in the Y axis mechanism moves the weld head 0.001 inch per pulse, it would take 10 seconds to move the head 300 1 inch.

k. Y axis "Ahead Distance" Adjustment. For example, if the decade counters 363, 364, and 365 are set for 100 pulses, the weld head moves forward 1 inch in 10 seconds.

l. Y axis "Back Distance" Adjustment. For the first pass, the counters 366, 367, and 368 may be set for 0.

m. Y axis "Dwell" Adjustment. For the first pass, the counters 370, 371, and 372 may be set for 0.

The weld operation now begins and continues as follows:

1. Root pass weld (FIGS. 26 and 27). FIG. 25 shows the weld head 300 positioned at 12 o'clock on the pipe 321 with its connecting cables 334 and 335, its wire feed 336, its gas flow control conduit 337, its weld energy power supply 327, its head controller 350, and the foot controller 328 for the weld energy source. The operator initiates the weld by pressing his foot on the weld energy source start-stop current foot control 328. With this action, gas flow occurs for 10 seconds, as set by a time clock for the weld energy source, before the weld energy bridges the gap between the tungsten and the work, and the weld process begins. The operator adjusts his foot-actuated weld energy potentiometer 328 to bring the weld start area up to heat. With his right hand he then presses the start button 377 on the weld head controller 350, and the torch 310 begins moving to the right, taking 1 second to go across and 1 second to come back, laying the root bead 340 of the weld. During this oscillating motion, the head 300 is moving forward along the V channel 322 from 12 o'clock to 6 o'clock at a uniform rate of 1 inch in 10 seconds. The pattern 341 traced by the tungsten electrode 310 across and along the weld 340 has the appearance of the figure shown in FIG. 27. During the movement of the weld head 300 from 12 to 6 o'clock, the operator is in a position to vary the weld energy with his foot and also to adjust (a) the oscillation rate, or (b) the forward motion, by adjusting the appropriate switches on the controller 350. As the weld head 300 passes 6 o'clock and proceeds towards 12 (where the weld has started), a number of corrections are necessary. When the weld head 300 reaches 12 o'clock and slightly overwelds the initial start, the operator presses the stop button 378 of the controller 350, stopping the head motions and the wire feed, and releases pressure from his foot controller 328, reducing the weld energy and extinguishing the arc. Gas postflow continues for 10 seconds, then cuts off the first pass or bead 340 is completed.

2. Filler bead pass (left) (FIGS. 27 and 28). The next weld to be performed is a filler bead 342 on the left side of the groove 322. To do this, the operator raises the tungsten electrode 300, presses the left jog button 373 to move the tungsten electrode 300 to the left-hand edge to the position desired to start the second bead. (See FIG. 28.) At this time he also readjusts the controller 350 for the new X axis distance and possibly a different oscillation rate. If it is now desired that instead of continuous back and forth motion, a certain amount of dwell or hesitating is desirable at the terminus of each X axis traverse, the forward-backward Y axis section of the controller 350 would now, in addition to the "Ahead Distance" setting, be set on the dwell switches 370, 371, and 372. For example, if the operator desires a one-tenth second dwell, he sets the switch 371 to 100. With this setting, the tungsten electrode 310 progresses across the weld with forward motion, but upon reaching the end of its traverse, measured by the programmed number of pulses, its return motion is delayed for one-tenth of a second while the forward motion continues. The resulting weld pattern 343 is shown in FIG. 29.

3. Filler bead pass (right) (FIGS. 30 and 31). After the filler bead pass (left) operation has continued completely around the pipe 321, the operator stops the head 300 at the 12 o'clock position and moves the tungsten electrode 310 to the right side zone and makes the necessary manual adjustments for X and Y axis motion for the third weld bead 344 as shown in FIG. 30, the pattern 345 being shown in FIG. 31. Since this pass is symmetrical to the bead 342, it need not be described in detail.

4. Cover pass (FIGS. 32 and 33). For a last, or cover, pass 346 in order to assure good side penetration to the parent metal, the operator may wish to use a pattern 347 shown in FIG. 33. In this case, the tungsten electrode 310 is again positioned at the left-hand side of the weld by use of the X axis jog switch 373, and adjustments for the proper vertical height from the weld are made manually.

Adjustments to the controller 350 are as follows: Assuming the same oscillation rate of 125 pulses per second for the X axis, in order to span the entire width of the V joint, the distance may be set at 990, by setting the switch 357 at 9, the switch 356 at 9, and the switch 355 at 0. Assuming the same rate for the Y axis motion, the "Ahead Distance" setting is put at 30, by setting the switch 363 at 0, the switch 364 at 30, and the switch 365 at 0. The "Back Distance" may be set at 20, by setting the switch 366 at 0, the switch 367 at 20, and the switch 368 at 0. With these settings, the torch 310 traverses from the left-hand side to the right-hand side with no forward motion; however, upon reaching the right side, it moves ahead 30 pulses, retreats 20 pulses, and then performs the return traverse. The net forward motion is 10 pulses, which corresponds to 0.01 inch.

After making these settings, the operator initiates the weld operation, and after the head has made a 360° revolution around the pipe 321, the weld is complete.

This illustrates one operation of the simplified welder 300. With the welding machine 100, almost all the manual operations except starting the switch could have been eliminated.

USE OF THE SIMPLIFIED WELD HEAD 300 WITH ROTATING PIPE (FIG. 36)

The simplified weld head 300 can also be used to perform a weld on a horizontal pipe 394, with the head 300 remaining horizontal and the pipe 394 rotating underneath. Support brackets 395 enable the weld head 300 to be moved up and down and along pipes 396. Rollers 397 cradle the pipe 394 and are not driven, while rollers 398 are driven by a flexible shaft 399 which is in turn attached to and driven by the pulse motor 302. Thus, digital control is still obtained, even though in this case the workpiece is moved during welding rather than the weld head.

A FREE FORM OR TEMPLATE WELDER (FIGS. 37 AND 38)

The simplified weld head 300 may be mounted so as to perform oscillating-type welds from a fixed pattern. A template 400 is held in fixed relationship with a part 401 to be welded. An arm assembly 402 is arranged in pantograph fashion to enable a pattern following device 403 to follow the contour of the pattern 400. Two vertical shafts 404 and 405 are permanent magnets, and attached to them are two gears 406 and 407 which mate with a gear 408 that is driven through a mechanical linkage from a flexible shaft 409 from the pulse motor 302. As the magnetic shafts 404 and 405 interface with and grip the template 400, a line L through the magnetic shafts 404 and 405 is parallel to a tangent T of the template 400, as shown in FIG. 38. The pattern following head 403 and a weld head adapter bracket 410 have parts that are free to rotate within bearings mounted in a pipe 411 attached to the arm assembly 402. As the head 403 follows the template 400, the weld head 300 is always positioned so that its X axis is perpendicular to the template 400. The welding torch 310 is positioned vertically, and oscillation of the torch 310 is then at right angles to the weld and will follow the template 400 along the changing Y axis line to give a weld line 412.

If desired, a mechanical linkage can be arranged with an additional cam or template to produce up and down motion to weld contours. The weld head 100 can be used with even better results.

AN INTERNAL PIPE WELDER (FIGS. 39)

The weld head 300 or 100 may be mounted inside a large diameter pipe 420. A spider assembly 421 is arranged to provide a shaft 422 along the center axis of the pipe 420. To this shaft 422 may be attached an assembly 423, which positions the weld head 300 against the inside surface 424 of the pipe 420. Variations in pipe diameter and contact pressure may be accommodated by a hydraulic cylinder 425. Motion around the pipe can be obtained two ways: (1) by a flexible shaft 426 from the weld head 300 through proper gearing to the assembly 421 or (2) by directly driving some wheels 427.

A VERTICAL, INCLINED OR OVERHEAD PLATE WELDER (FIG. 40)

The weld head 300 or 100 may be arranged by vertical welding on a flat plate 430, and this same method may be used for welding plate in any plane. Tracks or racks 431 are attached to the plate by bolts, magnetic devices, or vacuum devices 432, and the racks 431 have internal slots to retain the weld head 300.

A LARGE CIRCUMFERENCE TANK OR WHEEL WELDER (FIG. 41)

Figure 40:
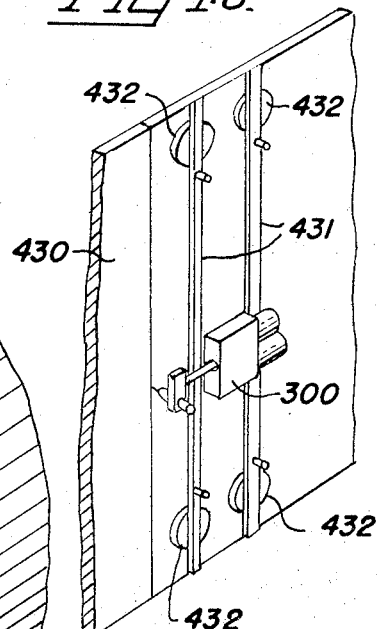
FIG. 40 is a fragmentary view in perspective of a vertical weld operation being performed by the simplified weld head of FIG. 24.
Figure 39:
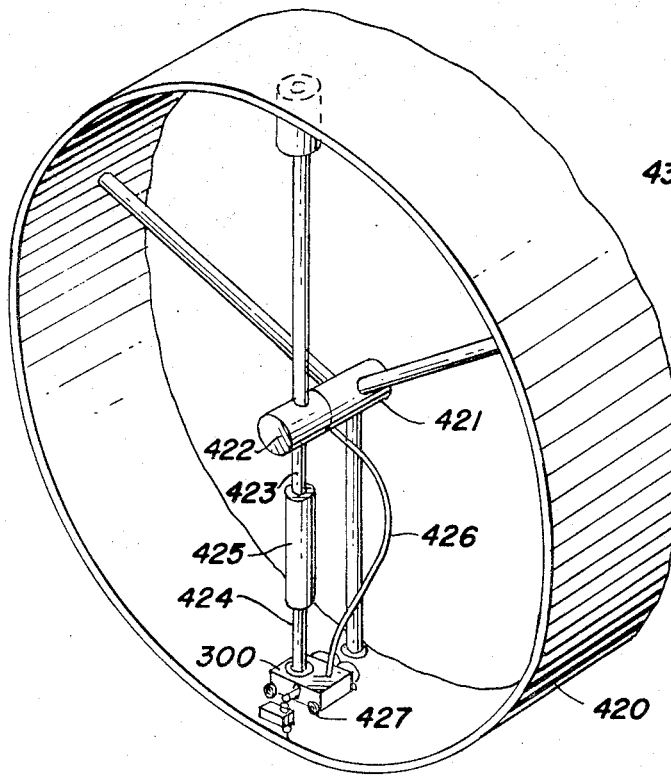
FIG. 39 is a view in perspective of an internal pipe weld being performed by the simplified weld head of FIG. 24.
Figure 41:
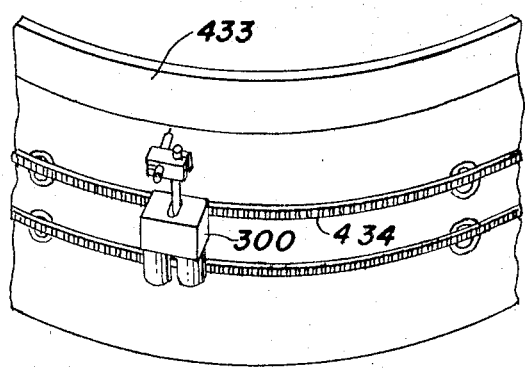
FIG. 41 is a fragmentary view in perspective of an external cylindrical weld operation being performed by the simplified weld head of FIG. 24.

FIG. 41 shows the weld head 300 (or 100) arranged for welding around a circular member 433 in vertical position. Tracks or racks 434 similar to the racks 431 described in FIG. 40 are utilized. In order to equalize welding stresses on a circular member of this type and to decrease the time required to complete such a weld, a number of weld heads 300 or 100 may be mounted on the tracks 434 and operated simultaneously.

MANUAL CORRECTION CONTROL (FIGS. 42—45)

In general job shop welding, as well as in the production shop, many factors arise calling for the ability to introduce minor corrections to an automatic or semiautomatic weld process. Typical factors are: poor weld surface preparation, nonuniform materials, varying thickness of material, residual contamination, inclusions, misalignment, warping, and poor fit-up.

With the system of this invention such corrections may be handled by two jog control devices 440 (FIGS. 42—44) and 441 (FIG. 45), comprising two vertical gear shift sticks 442 and 443 having knobs 444 and 445 on their respective ends. Each gear shift stick 442 and 443 has the ability of introducing corrections to a grouping of weld parameters. For example, one jog control stick 442 may control the following motions in the weld head 300 or 100: (1) up-down, (2) cross cant, (3) longitudinal cant, (4) forward-back, and (5) oscillating. The other jog control stick 444 may control (6) wire feed, (7) weld energy adjustments, and (8) shielding gas adjustments.

Like other components of the invention, the jog control devices 440 and 441 are pulse actuated. For example, a jog control pulse generator may put out continuously 1, 10, and 100 pulses per second, and these pulses may be either negative or positive polarity depending upon the direction of correction desired, i.e., up-down, right-left, more-less, etc. If the weld observer notes that only a small correction is needed, he closes the plus or minus polarity switch that would apply the correction in the desired direction and uses the "one" pulse rate. Should a large correction be necessary, he would close the 10 or 100 pulse switch.

While three levels of correction (1—10—100 pulses) have been described, actually the design of the device can provide for these levels or steps to be increased to any number, depending upon the degree of fineness required in the correction process.

The switches mentioned may be contained in a gear shift type of jog control. Depending upon the arrangement or design of the logic (electronic circuitry) in the master controller, these corrections can override the pulse program scheduled to be carried out, by delaying completion pulses, initiating triggering pulses, and adding or subtracting pulse counts.

In addition to operator observed, manually induced corrections, similar adjustments can be made automatically through the use of sensing devices and an analogue-digital converter.

FIG. 44 shows how one stick 442 may give five individual control mechanisms, each with positive and negative adjustment capability of 1-10-100 pulses. Thus, any one of the five weld head motions X, Y, Z, Cant A, and Cant L may be adjusted with the single hand control stick 442.

In FIG. 43, the stick 442 is shown mounted in a ball joint 450 in a plate 451 in a manner that gives it the two directions of motion Cant A and Cant L in FIG. 44 about the ball joint 450. Contact points 452 activated by a switch leaf 453 move in the curve of motion Cant A. The switch leaf 453 has a centering action as a result of indent assembly 454 comprising a ball spring and retaining tube. As the stick 442 is moved in the curve of motion Cant L, contacts 455 are similarly activated by a switch leaf 456, having an indent assembly 457 for centering it in a neutral position.

The knob 444 is fastened to a shaft 458 which moves up and down in the stick 442 relative to a fastened switch leaf 459 which engages contacts 460, which in turn are arranged to remain in plane with the axis of the shaft 457 moving vertically in the direction Z. An indent 461 provides a neutral position.

The combined assembly 442 and 457, attached to the plate 451 (FIG. 42), moves in a plane X between slides 462 and 463. This sliding action causes a switch leaf 464 to engage contacts 465, while an indent like those shown in FIG. 43 provides a fixed neutral position. A plate 467 moves in the plane Y and is retained by slides 468 and 469. A switch leaf 470 engages contacts 471, and neutral is provided by an indent assembly like those of FIG. 43.

The second "gear shift stick" control 441 for the other hand is shown in FIG. 45. This stick 441 incorporates two separate controls—one for the wire feed and the second for making weld energy adjustments. In FIG. 45, the stick 443 is attached to a trunnion assembly 473 turning on bearings 474. A switch leaf 475 engages contacts 476, and an indent assembly 477 provides a neutral position. The ball 445 is attached to a shaft 478 which passes through the stick 444 and rotates a switch leaf 479, which in turn engages contacts 480, while an indent 481 provides a neutral position.

AUTOMATED CORRECTION CONTROLS (FIGS. 46 to 49)

A number of automatic correction control devices can be attached to the welding head 100. These devices carry out a sensing role and register any corrective need with the master controller, which, in turn, automatically feeds corrective pulses to the proper mechanism. The sensing devices can be any one of a number of types—mechanical, electrical, magnetic, optical, and heat sensing, to name some.

Figure 46:
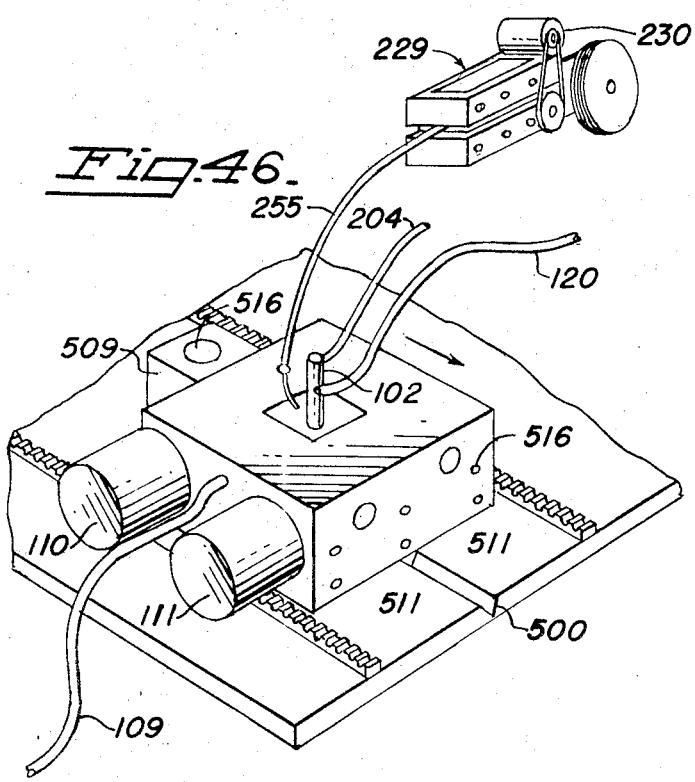
FIG. 46 is a view in perspective of a weld head of the invention like that of FIG. 12 moving along a weld.
Figure 47:
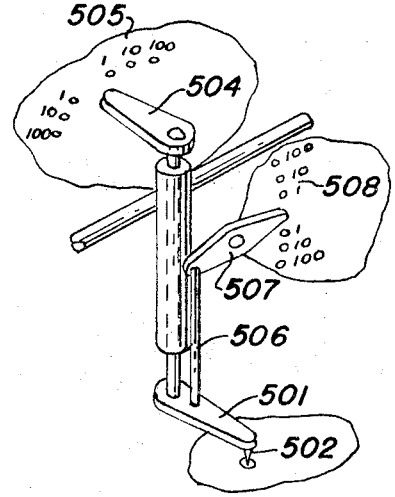
FIG. 47 is a partially perspective view and partially diagrammatic view of a correction device for adjusting misalignment of the device of FIG. 46.

FIG. 46 shows the welding head 100 moving along a weldment 500, which may be either along a flat plane or around a pipe. A mechanical correction device for lateral or up and down misalignment of this arrangement is shown in FIG. 47. A stylus arm 501 is designed with a point or roller 502 to ride or track the channel 500 to be welded. The arm 501 can rotate in two planes to provide both vertical and lateral torch movement corrections. This arm 501 may be attached to a shaft 503 which rotates a switch leaf 504 against lateral movement contacts 505. As the arm 501 moves up and down a guide shaft 506, a switch leaf 507 engages vertical movement contacts 508. A time delay relay 509 geared to the forward speed of the weld head 100 accurately indexes the torch 101 as it reaches the area that signaled for corrective action.

Figure 48:
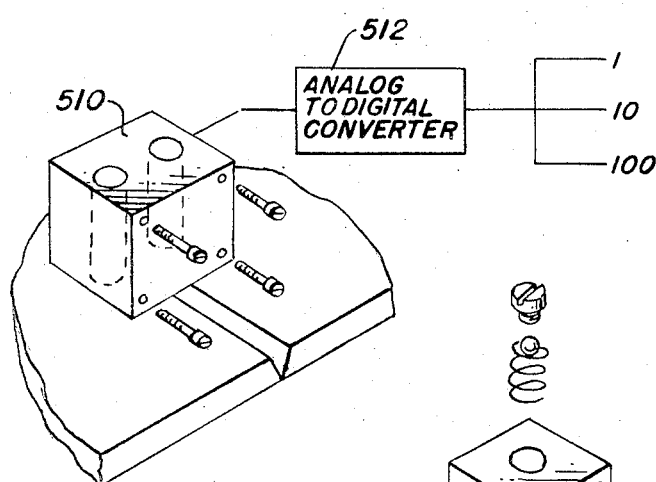
FIG. 48 is a partly diagrammatic view, partly perspective view, of a tracking device.

FIG. 48 shows one of the many available magnetic, optical, and other tracking devices 510 that may be mounted on the weld head 100 at the sockets 511 of FIG. 46. An analogue-to-digital converter 512 may be included to give digital pulse readouts of 1-10-100 to right and left or up and down.

Figure 49:
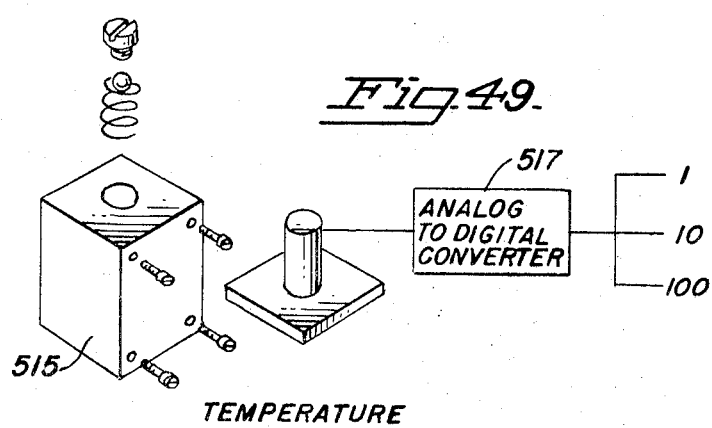
FIG. 49 is a partly diagrammatic view, partly perspective view, of a temperature correction device.

Temperature sensing is illustrated in FIG. 49 with a device 515 that may be mounted at point 516 in FIG. 46, to the side of the weld channel. Such a device is important when making multiple pass welds, as when joining sections of pipe, where the base metal increases in temperature after each pass. In these cases, weld energy has to be reduced to produce molten puddle conditions comparable to the earlier welds. Residual heat detected by the sensor, when translated through an analogue-digital converter 517 gives a pulse-actuated reduction of weld energy.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An integrated automatic welding machine, comprising:
   master clock and pulse-shaping means for producing shaped basic pulses at regular intervals and for producing shaped master pulses at longer regular intervals;
   a plurality of digitally set rate oscillator means each connected to said master clock and pulse-shaping means for controlling and varying the number of basic pulses delivered by itself between successive master pulses;
   digitally set sequential slope generator means connected to said master clock and pulse-shaping means for sequentially changing the number of basic pulses, delivered by itself between successive master pulses and for retaining a chosen such number for a chosen number of master pulses;
   a welding head having a welding torch mounted thereon;
   a plurality of pulse-operated position control means for said head for moving said torch along a welding path, each said position control means having a pulse motor connected to a corresponding rate oscillator means and determining the rate and amount of movement of said torch along one axis, the combinations of movement thereby adding up to the overall movement of said torch; and
   a source of weld energy connected to said torch and controlled by said slope generator means for delivering to said torch its needed energy in accordance with digital settings of said slope generator means, and pulse-operated wire feed means for feeding welding wire to said torch connected to and controlled by a separate said rate oscillator means.

2. The machine of claim 1 wherein said sequential slope generator comprises a combination of subtractor scalers, counters, and an integrator.

3. The machine of claim 1 wherein said rate oscillator means is connected to said pulse motors through translator and gating devices with pulse counters and bistable switches.

4. A welding machine, comprising:
   a welding head having a welding torch mounted for tilting movement thereof;
   first position control means for said head, for moving said torch forward and/or backward horizontally;
   second position control means for said head for moving said torch back and forth from side to side horizontally;
   third position control means for said head for moving said torch up and down vertically;
   tilt-control means for tilting said torch relative to said head and thereby relative to the weld; and
   said weld head comprising an outer housing moved by one said position control means, an intermediate housing moved inside said outer housing by another said position control means, an inner housing moved inside said intermediate housing by yet another said position control means, and torch mounting means tiltable inside said inner housing by said tilt control means.

5. The machine of claim 4 wherein said torch mounting means provides two tilting axes, one at right angles to the other and said tilt control means provides for separate means for controlling tilting in each of said axes.

6. The machine of claim 5 wherein each of said tilt control means and said position control means comprises a pulse-operated motor for digital pulse control thereby.

7. A weld head assembly, comprising a rectangular box having a central rectangular opening providing a welding well, said box having mounted thereon a first pulse-actuated stepping motor and drive gear means driven by said first motor;

track means on which said drive gear means are meshed and with which they are held in engagement, so that operation of said first pulse-actuated stepping motor propels said box along said track means;

a first movable platform within said box having a second pulse-actuated stepping motor supported thereon and first drive means actuated by said second motor;

means supported by said box in engagement with said first drive means for guiding movement of said first platform initiated by said second motor along a path within said box perpendicular to the motion along said track;

a second platform mounted movably with respect to said first platform and having thereon a third pulse-actuated stepping motor and second drive means actuated by said third motor;

means supported by said first platform in engagement with said second drive means for guiding movement of said second platform initiated by said third motor along an axis perpendicular both to said track path and the axis of movement of said first platform; and a weld torch supported by said second platform in said well.

8. The weld head assembly of claim 7 wherein said weld torch is supported on said second platform by first and second mutually perpendicular tilt means, each said tilt means having an associated pulse-actuated stepping motor for varying its particular tilt relative to said second platform.

9. The assembly of claim 7 having holddown means for holding said drive gear means in mesh with said track means.

10. The assembly of claim 9 wherein said holddown means comprises continuous link-chain means paralleling said track means and means on said box in engagement with said link-chain means.

11. The assembly of claim 7 wherein said assembly is adapted to move around an object being welded, said track means being shaped in a closed path around said object and means for holding said box to said track means as said box moves along said path.

12. The assembly of claim 7 having weld shield means between a bottom surface of said box and an object to be welded, and shielding gas supply means leading gas into said weld shield means.

13. The assembly of claim 7 having wire feed means for supplying weld wire to the weld and comprising an additional pulse-actuated stepping motor and wire drive means driven by said motor.

14. The assembly of claim 13 wherein said wire drive means comprises a plurality of belts of electrical insulating material compressed toward each other with the wire passing between them.

15. A weld head assembly, comprising a rectangular box said box having mounted thereon a first pulse actuated stepping motor, a second pulse-activated stepping motor, and drive gear means driven by said first motor;

track means on which said drive gear means are meshed and with which they are held in engagement, so that operation of said first pulse actuated stepping motor propels said box along said track means;

a movable platform within said box having first drive means actuated by said second motor;

means supported by said box in engagement with said first drive means for guiding movement of said platform initiated by said second motor along a path within said box perpendicular to the motion along said track; and a weld torch supported by said platform to one side of said box.